US012172878B2

(12) United States Patent
Tang

(10) Patent No.: US 12,172,878 B2
(45) Date of Patent: Dec. 24, 2024

(54) BALANCED LIFTING DEVICE, VEHICLE-MOUNTED EXCHANGE BOX SYSTEM AND MULTI-OIL CYLINDER SYNCHRONIZATION METHOD

(71) Applicant: Chengdu Wutian IOT Technology CO., LTD., Chengdu (CN)

(72) Inventor: Jinliang Tang, Chengdu (CN)

(73) Assignee: CHENGDU WUTIAN IOT TECHNOLOGY CO., LTD., Chengdu (CN)

( * ) Notice: Subject to any disclaimer, the term of this patent is extended or adjusted under 35 U.S.C. 154(b) by 631 days.

(21) Appl. No.: 17/594,504

(22) PCT Filed: Jan. 21, 2021

(86) PCT No.: PCT/CN2021/073159
§ 371 (c)(1),
(2) Date: Oct. 20, 2021

(87) PCT Pub. No.: WO2022/037013
PCT Pub. Date: Feb. 24, 2022

(65) Prior Publication Data
US 2022/0297987 A1  Sep. 22, 2022

(30) Foreign Application Priority Data
Aug. 19, 2020  (CN) .......................... 202010839136.7

(51) Int. Cl.
*B66F 9/18* (2006.01)
*B60P 1/54* (2006.01)
(Continued)

(52) U.S. Cl.
CPC .............. *B66F 9/18* (2013.01); *B60P 1/5428* (2013.01); *B60P 1/6472* (2013.01); *B66C 23/44* (2013.01);
(Continued)

(58) Field of Classification Search
CPC ..... B60P 1/6472; B60P 1/5423; B60P 1/6436; B60P 1/486; B60P 1/6463; B66F 9/18;
(Continued)

(56) References Cited

U.S. PATENT DOCUMENTS 6,565,307 B1 *  5/2003  Niemela ............... B60P 1/6472
414/547

FOREIGN PATENT DOCUMENTS

| CN | 104691394 A | 6/2015 |
| CN | 111115449 A | 5/2020 |
| CN | 211055007 U | 7/2020 |
| CN | 211644369 U | 10/2020 |
| WO | 2016206792 A1 | 12/2016 |

OTHER PUBLICATIONS

International Search Report issued in PCT/CN2021/073159, mailed May 11, 2021; 5 pgs.
(Continued)

*Primary Examiner* — Timothy R Waggoner
(74) *Attorney, Agent, or Firm* — HAUPTMAN HAM, LLP

(57) ABSTRACT

A balanced lifting device comprises at least two lifting arms arranged opposite to each other, each lifting arm comprises a balance arm and an actuating arm driving the balance arm to move, the balance arm is rotatably connected to the actuating arm at a rotatably connected part, and a first drive device is arranged between the balance arm and the actuating arm to drive the balance arm to a horizontal state throughout the lifting process. A vehicle-mounted exchange box system and a multi-oil cylinder synchronization method are also provided in the present invention. A cargo box may be lifted stably to improve the operation safety, the vehicle utilization rate is improved by saving the waiting time for loading and unloading in the transfer process.

8 Claims, 6 Drawing Sheets

(51) Int. Cl.
  *B60P 1/64* (2006.01)
  *B66C 23/44* (2006.01)
  *B66C 23/70* (2006.01)
  *B66F 9/065* (2006.01)
  *B66F 9/075* (2006.01)
(52) U.S. Cl.
  CPC .......... *B66C 23/701* (2013.01); *B66F 9/0655* (2013.01); *B66F 9/0755* (2013.01)
(58) Field of Classification Search
  CPC ...... B66F 9/0655; B66F 9/0755; B66C 23/44; B66C 23/701; B66C 13/20; B66C 23/42; B66C 23/70; B60R 16/0232; B60W 50/00; B60W 50/08
  See application file for complete search history.

(56) References Cited

OTHER PUBLICATIONS

First Office Action in Chinese Application No. 202010839136.7, dated May 30, 2021; 15 pgs.
International Preliminary Report on Patentability in Corresponding International Application No. PCT/CN2021/073159, mailed Nov. 16, 2022; 9 pgs.
International Search Report in Corresponding International Application No. PCT/CN2021/073159, mailed May 11, 2021; 8 pgs.
Written Opinion in Corresponding International Application No. PCT/CN2021/073159, mailed May 11, 2021; 8 pgs.

* cited by examiner

BALANCED LIFTING DEVICE, VEHICLE-MOUNTED EXCHANGE BOX SYSTEM AND MULTI-OIL CYLINDER SYNCHRONIZATION METHOD

RELATED APPLICATIONS

The present application is a U.S. National Phase of International Application Number PCT/CN2021/073159 filed Jan. 21, 2021 and claims priority to Chinese Application Number 202010839136.7 filed Aug. 19, 2020.

FIELD OF THE INVENTION

The present invention relates to the technical field of vehicle loading and unloading, in particular to a balanced lifting device, a vehicle-mounted exchange box system and a multi-oil cylinder synchronization method.

BACKGROUND OF THE INVENTION

When transported by traditional logistics vehicles, cargo boxes are handled with the aid of auxiliary lifting devices at the operation site. To eliminate the dependence on lifting devices at the operation site, improve the independent handling efficiency of logistics vehicles and realize the rapid cargo transfer transportation by logistics vehicles with lower waiting time for loading and unloading and higher utilization rate of vehicles in the process of transfer transportation, currently some logistics vehicles have been equipped with corresponding special equipment for lifting cargo boxes, for example, installing lifting arms on logistics vehicles to load and unload cargo boxes.

Although cargos can be lifted by installing lifting arms on logistics vehicles, the center of gravity of the box will shift in the lifting process due to unbalanced loading of cargos in the box because the lifting arms are connected to the box through lifting ropes in the current the current lifting methods. If the above traditional lifting method is used, the box will incline in the lifting process, making it impossible to keep the box stable. Moreover, because of large size and weight of the box itself, there will be a great potential safety hazard when the box becomes unstable in the lifting process. Therefore, how to achieve stable lifting of large cargo boxes has become an urgent problem.

In addition, prior to the lifting of a box, logistics vehicles shall be placed at a suitable position on one side of the box for facilitating the butt joint with the box by controlling a lifting arm. Therefore, the urgent problems to be solved at present are how to guide the vehicles to a suitable position next to a box to achieve effective butt joint of the lifting arm with the box, and how to automatically adjust a balance arm to keep it in a horizontal state throughout the lifting process.

SUMMARY OF THE INVENTION

In view of the above problems in the prior art, the present invention provides a balanced lifting device, a vehicle-mounted exchange box system and a multi-oil cylinder synchronization method. Therefore, a cargo box can be lifted stably to improve the operation safety, cargos can be rapidly transferred by logistics transfer vehicles with lower waiting time for loading and unloading and higher utilization rate of vehicles in the transfer process, vehicles can be guided to a required position to ensure effective butt joint of the lifting arm with a box, and the balance arm can be automatically adjusted to keep in a horizontal state throughout the lifting process, thus improving the degree of automation and work efficiency.

The technical solution adopted by the present invention is as follows:

A balanced lifting device includes at least two lifting arms arranged opposite to each other, wherein each one of the at least two lifting arms includes a balance arm and an actuating arm which drives the balance arm to move, the balance arm is rotatably connected to the actuating arm at a rotatably connected part, a first drive device is arranged between the balance arm and the actuating arm to drive the balance arm to a horizontal state throughout the lifting process, the balance arm is provided with a first connecting device and a second connecting device in butt joint with a box respectively, and the rotatably connected part is located between the first connecting device and the second connecting device.

According to the technical solution, the box is stably lifted by the lifting arms arranged opposite to each other. Specifically, two lifting arms, arranged at the front and rear ends of the box respectively, are simultaneously started to lift the box in the lifting process; while the balance arm is driven to move by the actuating arm. Since the balance arm is rotatably connected to the actuating arm, the balance arm can be driven to swing correspondingly by the first drive device in the swinging process of the actuating arm, so as to keep the balance arm always in a horizontal state throughout the lifting process and facilitate the horizontal butt joint of the balance arm with the box. In other words, after the actuating arm drives the balance arm to move towards the box in place, the balance arm is always in a horizontal state so that the first connecting device and the second connecting device on the balance arm can be in horizontal butt joint with the box. Further, after the first connecting device and the second connecting device are in butt joint with the box respectively, four hooking points will be formed between the whole balanced lifting device and the box in the same horizontal plane; therefore, the box can be always kept in a horizontal state in the lifting process, and will not incline even if cargos loaded in the box are unbalanced, thereby achieving stable lifting of cargo boxes and improving the operation safety.

Furthermore, in order to swing the actuating arm better, the actuating arm includes a frame body and a drive device for adjusting the telescopic length of the frame body and controlling the pendulum angle thereof, wherein the frame body includes at least two support arms, with the adjacent support arms rotatably connected in sequence, the frame body includes a movable support arm and a main support arm, and the drive device includes a second drive device for driving the movable support arm to swing and a third drive device for driving the main support arm to swing.

Furthermore, in order to detect the execution action and the butt joint of the lifting arm with the box, displacement sensors are arranged on the first drive device, the second drive device and the third drive device, and contact sensors are arranged on the first connecting device and the second connecting device.

Furthermore, in order to facilitate the integral installation of the actuating arms, the balanced lifting device further includes an underframe installed on a vehicle, and the actuating arms are all installed on the underframe. Four corners of the underframe are provided with hydraulic support legs, which are controlled to extend outward to the ground in case of heavy goods, so as to improve the safety during loading and unloading of the cargo boxes. To detect a vehicle position state, which is helpful to guide the vehicle running process and improve the convenience of vehicle operation and the accuracy of vehicle parking, one side, close to the box, of the underframe, is provided with a first distance measuring module and a camera, and four corners of the underframe are provided with second distance measuring modules. It should be noted that the camera has a zoom function.

Furthermore, in order to facilitate the horizontal butt joint of the first connecting device and the second connecting device with the box, both the first connecting device and the second connecting device include a telescopic butt-joint device and a first hooking part arranged at one end thereof, and the first hooking part is connected to a second hooking part arranged at a corresponding position on the box. It should be noted that the telescopic butt-joint device may be a telescopic gas cylinder, an electric telescopic rod, a telescopic butt-joint oil cylinder, or the like. The telescopic butt-joint oil cylinder is adopted in the present technical solution.

Furthermore, in order to form a stable frame structure between the whole lifting device and the box in the lifting process, an abutting device is arranged between the balance arm and the box to prevent the balance arm from inclining inwards in the lifting process, and the abutting device includes an abutting table arranged on the balance arm and an abutment arranged on the box and abutting against the abutting table. The first hooking part includes an abutting table and a hooking end, with a narrow hooking part formed therebetween; and the second hooking part includes an abutment and a hooking groove, with a hooking ring formed therebetween; wherein one side, close to the abutting table, of the hooking ring is an abutment, the narrow hooking part is hooked to the hooking ring, the hooking end is disposed in the hooking groove, and the abutting table abuts against the abutment.

In the technical solution, driven by the telescopic butt-joint oil cylinder, the lifting arm can be hooked to the box and the abutting table can abut against the abutment; therefore, the box can reversely support the lifting arm in the lifting process, and combined with the balance arm, the box can be maintained in a horizontal state, so that a stable frame structure is formed between the lifting arm and the box, thereby solving the problem that the structural strength of the lifting arm may be affected due to the inward inclination of the box in the lifting process.

The present invention further provides a vehicle-mounted exchange box system, which includes a controlled lifting system and the balanced lifting device, and the controlled lifting system includes an actuator, a control module, a vehicle position state feedback module, an actuator state feedback module and a human-computer interaction terminal;

the actuator includes a first drive device, a second drive device, a third drive device and a telescopic butt-joint device, and is used for controlling the lifting arm to execute corresponding actions;

the control module controls the actuator to execute corresponding actions;

the vehicle position state feedback module includes a distance feedback module and an image feedback module, wherein the distance feedback module includes a first distance measuring module arranged on one side, close to the box, of the underframe, and is used for detecting the distance between a vehicle and the box and transmitting the collected distance data to the control module; and the image feedback module includes a camera arranged on one side, close to the box, of the underframe, and is used for shooting relative position relationship image between a vehicle and the box and transmitting the collected image information to the human-computer interaction terminal;

the actuator state feedback module includes a displacement sensor and is used for detecting an actuator action state and transmitting the collected actuator action state data to the control module; and the human-computer interaction terminal is in signal connection with the camera and the control module respectively.

Furthermore, the vehicle-mounted exchange box system further comprises a butt joint state feedback module, which comprises contact sensors arranged on the first connecting device and the second connecting device, and is used for detecting the butt joint of the lifting arm with the box and transmitting the collected butt-joint state data to the control module; and the vehicle position state feedback module further includes a vehicle horizontal state detection module, which includes second distance measuring modules arranged at four corners of the underframe, and is used for detecting the horizontal state of a vehicle and transmitting the collected horizontal state distance data to the control module.

The present invention provides a multi-oil cylinder synchronization method, which includes the following steps:

obtaining the desired motion trajectory parameter values X, Y and Z of the two lifting arms:

the motion trajectory parameter values include the desired telescopic length value Z of the first drive device, the desired telescopic length value Y of the second drive device and the desired telescopic length value X of the third drive device;

calculating error values $\Delta s$ between the two lifting arms at the current moment:

obtaining AD values $\Delta ad$ read by displacement sensors corresponding to the first drive device, the second drive device and the third drive device at the current moment;

calculating telescopic length values S of the first drive device, the second drive device and the third drive device in the two lifting arms respectively at the current moment according to the obtained values $\Delta ad$;

calculating telescopic length error values $\Delta s$ between the first drive device, the second drive device and the third drive device in the two lifting arms at the current moment respectively according to the obtained telescopic length values S;

calculating difference values e(t):

calculating the difference values e(t) between the telescopic length values S of the first drive device, the second drive device and the third drive device at the current moment and the desired telescopic length values X, Y and Z of the first drive device, the second drive device and the third drive device respectively according to the obtained X, Y and Z values and the obtained telescopic length value S;

conducting compensation operation:

conducting compensation operation by inputting the obtained telescopic length error values $\Delta s$ and the obtained difference values e(t) into a PID controller to obtain compensation values $\Delta d$ and calculating the telescopic lengths S of the corresponding first drive device, second drive device and third drive device according the compensation values $\Delta d$ obtained from the e(t) of the previous node.

Furthermore, for obtaining the desired motion trajectory parameter values X, Y and Z of the two lifting arms,
X, Y and Z are calculated as follows:

$$X=-GH \times <FED+<ABC+<ABO-\pi-<EDBC-<HG-X_{IH}$$

$$Y=GH \times \sin(<FED+<ABC+<ABO-\pi<ED-BC-<HG-EF)+Y_{IH})$$

$$Z=\sqrt{x^2+y^2}$$

$$<FED=\arccos((DE^2+FE^2-FD^2) \div (2 \times DE \times FE))$$

$$<ABC=\arccos((BC^2+AB^2-AC^2) \div (2 \times AB \times BC))$$

<ED–BC is an included angle between line DE and line BC;
<HG–EF is an included angle between HG line and EF line;
$Y_{IH}$ is a vertical distance between point I and point H, $Y_{IH}=Hy-Iy$;
$X_{IH}$ is a horizontal distance between point I and point H, $X_{IH}=Hx-Ix$
Hx is the horizontal coordinate of point H with point O as the origin of coordinates;
Hy is the vertical coordinate of point H with point O as the origin of coordinates;
Ix is the horizontal coordinate of point I with point O as the origin of coordinates;
Iy is the vertical coordinate of point Y with point O as the origin of coordinates;
Point H is the rotation connection point between the movable support arm and the balance arm, and the coordinates of point H are calculated by the following formulas:

$$Hx=w1+d1+\tfrac{1}{2}w2; Hy=h2+h1-h3$$

d1 is a distance between the lifting arm and the box, that is, a distance between point B of the lifting arm and the box; w1 is a distance from point O to point B on the right side of a vehicle, that is, a length of OB; w2 is a box width; h1 is a relative height difference between the box bottom and the device bottom; h2 is a box height; and h3 is a height from point O to the ground;
Point I is a rotational connection point between the first drive device and the balance arm, and the horizontal coordinate and vertical coordinate of point I are as follows:

$$Ix=X; Iy=Y$$

X and Y are constants obtained according to the mechanical structure.
Furthermore, when calculating error values Δs between the two lifting arms at the current moment:
S is calculated by the following formula:

$$S = \frac{\Delta ad - \Delta d}{k}$$

Δad is an AD value read by the displacement sensor corresponding to the drive device;
Δd: compensation value;
k is a ratio of the lengths of the first drive device, the second drive device and the third drive device to the AD value read by the corresponding displacement sensors;

Δs is calculated by the following formulas:

$$\Delta s1 = S_{z1} - S_{f1} = \frac{\Delta ad - \Delta dz1}{k} - \frac{\Delta ad - \Delta df1}{k}$$

$$\Delta s2 = S_{z2} - S_{f2} = \frac{\Delta ad - \Delta dz2}{k} - \frac{\Delta ad - \Delta df2}{k}$$

$$\Delta s3 = S_{z3} - S_{f3} = \frac{\Delta ad - \Delta dz3}{k} - \frac{\Delta ad - \Delta df3}{k}$$

the two lifting arms are the main arm and the auxiliary arm respectively:
Δs1 is a telescopic length error value between the first drive devices of the main arm and of the auxiliary arm;
Sz1 is a telescopic length of the first drive device of the main arm:

$$Sz1 = \frac{\Delta ad - \Delta dz1}{k};$$

Δdz1 is a compensation value of the first drive device of the main arm;
Sf1 is a telescopic length of the first drive device of the auxiliary arm:

$$Sf1 = \frac{\Delta ad - \Delta df1}{k}$$

Δdf1 is a compensation value of the first drive device of the auxiliary arm;
Δs2 is a telescopic length error value between the main arm and the second drive device of the auxiliary arm;
Sz2 is a telescopic length of the second drive device of the main arm:

$$Sz2 = \frac{\Delta ad - \Delta dz2}{k};$$

Δdz2 is a compensation value of the second drive device of the main arm;
Sf2 is a telescopic length of the second drive device of the auxiliary arm:

$$Sf2 = \frac{\Delta ad - \Delta df2}{k};$$

Δdf2 is a compensation value of the second drive device of the auxiliary arm;
$\Delta_{s3}$ is a telescopic length error value between the main arm and the third drive device of the auxiliary arm;
$S_{Z3}$ is a telescopic length of the third drive device of the main arm:

$$Sz3 = \frac{\Delta ad - \Delta dz3}{k};$$

Δdz3 is a compensation value of the third drive device of the main arm;

$S_{f3}$ is a telescopic length of the third drive device of the auxiliary arm:

$$Sf3 = \frac{\Delta ad - \Delta df3}{k};$$

$\Delta df3$ is a compensation value of the third drive device of the auxiliary arm.

Furthermore, when calculating the difference value e(t), E(t) is calculated by the following formulas:

$$e(t)z1 = Xz1 - Sz1 = Xz1 - \frac{\Delta ad - \Delta dz1}{k};$$

$$e(t)f1 = Xf1 - Sf1 = Xf1 - \frac{\Delta ad - \Delta df1}{k}$$

$$e(t)z2 = Yz2 - Sz2 = Yz2 - \frac{\Delta ad - \Delta dz2}{k};$$

$$e(t)f2 = Yf2 - Sf2 = Yf2 - \frac{\Delta ad - \Delta df2}{k}$$

$$e(t)z3 = Zz3 - Sz3 = Zz3 - \frac{\Delta ad - \Delta dz3}{k};$$

$$e(t)f3 = Zf3 - Sf3 = Zf3 - \frac{\Delta ad - \Delta df3}{k}$$

Xz1 is an expected telescopic length value of the first drive device of the main arm;

Xf1 is an expected telescopic length value of the first drive device of the auxiliary arm;

Yz2 is an expected telescopic length value of the second drive device of the main arm;

Yf2 is an expected telescopic length value of the second drive device of the auxiliary arm;

Zz3 is an expected telescopic length value of the third drive device of the main arm;

Zf3 is an expected telescopic length value of the third drive device of the auxiliary arm;

e(t)z1 is the difference between the expected telescopic length value Xz1 of the first drive device of the main arm and the expected telescopic length value Sz1 of the first drive device of the main arm;

e(t)f1 is the difference between the expected telescopic length value Xf1 of the first drive device of the auxiliary arm and the expected telescopic length value Sf1 of the first drive device of the auxiliary arm;

e(t)z2 is the difference between the expected telescopic length value Xz2 of the second drive device of the main arm and the expected telescopic length value Sz2 of the second drive device of the main arm;

e(t)f2 is the difference between the expected telescopic length value Xf2 of the second drive device of the auxiliary arm and the expected telescopic length value Sf2 of the second drive device of the auxiliary arm;

e(t)z3 is the difference between the expected telescopic length value Xz3 of the third drive device of the main arm and the expected telescopic length value Sz3 of the third drive device of the main arm; and e(t)f3 is the difference between the expected telescopic length value Xf3 of the third drive device of the auxiliary arm and the expected telescopic length value Sf3 of the third drive device of the auxiliary arm.

Furthermore, in the compensation operation, the calculation formulae of the PID controller are as follows:

compensation operation of the first drive device of the main arm:

$$\Delta d_{Z1} = u(t)_{Z1} = p\left(e(t)_{Z1} + 1/TI \int e(t)_{Z1} dt + D * de(t)_{Z1}/dt\right)$$

$$e(t)_{Z1=}Xz1 - \frac{\Delta ad - \Delta dz1}{k}$$

where, an initial value of $e(t)_{Z1}$ is 0, $e(t)_{Z1}$ of a next node is solved by $\Delta d_{Z1}$ of a previous node, and $\Delta d_{Z1}$ of a next node is solved by $e(t)_{Z1}$ of a previous node;

compensation operation of the second drive device of the main arm:

$$\Delta d_{Z2} = u(t)_{Z2}$$
$$= p*(e(t)_{Z2} + I*e(t1)_{Z2} + e(t2)_{Z2} + e(t3)_{Z2}) +$$
$$D*(e(t2)_{Z2} - e(t1)_{Z2})$$

$$e(t)_{Z2=}Yz2 - \frac{\Delta ad - \Delta dz2}{k}$$

where, an initial value of $e(t)_{Z2}$ is 0, $e(t)_{Z2}$ of a next node is solved by $\Delta d_{Z2}$ of a previous node, and $\Delta d_{Z2}$ of a next node is solved by $e(t)_{Z2}$ of a previous node;

compensation operation of the third drive device of the main arm:

$$\Delta d_{Z3=}u(t)_{Z3} = p\left(e(t)_{Z3} + 1/I \int e(t)_{Z3} dt + D*de(t)_{Z3}/dt\right)$$

$$e(t)_{Z3=}Zz3 - \frac{\Delta ad - \Delta dz3}{k}$$

compensation operation of the first drive device of the auxiliary arm:

$$\Delta d_{f1=}u(t)_{f1} = p\left(\begin{array}{c} e(t)_{f1} + 1/I \int e(t)_{f1} dt + \\ D*de(t)_{f1}/dt \end{array}\right) - \Delta s1 * kp2$$

$$e(t)_{f1=}Xf1 - \frac{\Delta ad - \Delta df1}{k};$$

$$\Delta s1 = S_{z1} - S_{f1=}\frac{\Delta ad - \Delta dz1}{k} - \frac{\Delta ad - \Delta df1}{k}$$

where, initial values of e(t)f1 and $\Delta s1$ are 0, $e(t)_{f1}$ of a next node is solved by $\Delta d_{f1}$ of a previous node, $\Delta s1$ of a next node is solved by $\Delta d_{f1}$ and $\Delta d_{Z1}$ of a previous node, and $\Delta d_{f1}$ of a next node is solved by $e(t)_{f1}$ and $\Delta s1$ of a previous node;

compensation operation of the second drive device of the auxiliary arm:

$$\Delta d_{f2=}u(t)_{f2} = p*\left(\begin{array}{c} e(t)_{f2} + I*\left(e(t1)_{f2} + e(t2)_{f2} + e(t3)_{f2}\right) + \\ D*\left(e(t2)_{f2} - \Delta s2 * kp2\right) \end{array}\right)$$

$$e(t1)_{f2=}Yf2 - \frac{\Delta ad - \Delta df2}{k};$$

-continued
$$\Delta s2 = S_{z2} - S_{f2=} \frac{\Delta ad - \Delta dz2}{k} - \frac{\Delta ad - \Delta df2}{k}$$

where, initial values of $e(t)_{f2}$ and $\Delta s2$ are 0, $e(t)_{f2}$ of a next node is solved by $\Delta d_{f2}$ of a previous node, $\Delta s2$ of a next node is solved by $\Delta d_{f2}$ and $\Delta d_{z2}$ of a previous node, and $\Delta d_{f2}$ of a next node is solved from $e(t)_{f2}$ and $\Delta s2$ of a previous node;

compensation operation of the third drive device of the auxiliary arm:

$$\Delta d_{f3=}u(t)_{f3} = p*\begin{pmatrix} e(t)_{f3} + I*(e(t1)_{f3} + e(t2)_{f3} + e(t3)_{f3}) + \\ D*(e(t3)_{f3} - \Delta s3*kp3) \end{pmatrix}$$

$$e(t)_{f3} = Zf3 - \frac{\Delta ad - \Delta df3}{k};$$

$$\Delta s3 = S_{z3} - S_{f3=} \frac{\Delta ad - \Delta dz3}{k} - \frac{\Delta ad - \Delta df3}{k}$$

p is a proportional coefficient; I is an integral time constant; D is a differential time constant; parameters P, I and D are the optimum parameters obtained by debugging; kp2 is an error PID proportional coefficient; kp3 is an error PID proportional coefficient; I∫e(t)dt is an integral of errors, with the sum of errors e(t) between multiple measured values and expected values being e(t1)+e(t2)+e(t3); de(t)/dt is a differential of errors, wherein the de(t)/dt is (e(t2)−e(t1)) if error 1 is e(t1) and error 2 is e (t2).

The present invention has the following advantageous effects: according to the technical solution, the box can be stably lifted by the lifting arms arranged opposite to each other. Specifically, two lifting arms, arranged at the front and rear ends of the box respectively, are simultaneously started to lift the box in the lifting process; while the balance arm is driven to move by the actuating arm. Since the balance arm is rotatably connected to the actuating arm, the balance arm can be driven to swing correspondingly by the first drive device in the swinging process of the actuating arm, so as to keep the balance arm always in a horizontal state throughout the lifting process and facilitate the horizontal butt joint of the balance arm with the box. In other words, after the actuating arm drives the balance arm to move towards the box in place, the balance arm is always in a horizontal state so that the first connecting device and the second connecting device on the balance arm can be in butt joint with the box horizontally. Further, after the first connecting device and the second connecting device are in butt joint with the box, four hooking points will be formed between the whole balanced lifting device and the box in the same horizontal plane; therefore, the box can be always kept in a horizontal state in the lifting process, and will not incline even if cargos loaded in the box are unbalanced, thereby achieving stable lifting of cargo boxes and improving the operation safety.

In addition, according to the technical solution, a vehicle can be guided to a required position to ensure effective butt joint of the lifting arm with a box, and the balance arm may be automatically adjusted to a horizontal state throughout the lifting process, thus improving the degree of automation and work efficiency.

According to the multi-oil cylinder synchronization method of the technical solution, the motion trajectory of the mechanical arm is calculated by combining with the field environment and split into the motion points of the working oil cylinders. Oil cylinders are controlled independently to read the desired piston position at regular intervals. Through simultaneous movement of multiple oil cylinders, the expected value is read as per time line, and six oil cylinders independently complete smooth movement. The output opening is obtained by an oil cylinder controller through PID operation. The combination of traditional PID formula and compensated PID value enables various arms to restrict each other and keep synchronous movement on the basis of independent movement in the linkage process.

The technical solution is mainly based on a time line, wherein the lowering and grabbing process of the mechanical arm is fixed and timed by a chronograph, and segmented according to different speeds, so that the mechanical arm can act at a similar speed and move more smoothly in the whole process. With T as a time interval, every T seconds, controllers of six oil cylinders involved in this movement obtain an expected position from a trajectory table, i.e., the expected motion trajectory parameter values X, Y and Z of two lifting arms, the expected position, and the position fed back by a displacement sensor, which are used for closed-loop operation; at the same time, a processor sends opening parameters of oil cylinders of various arms to proportional valves of oil cylinders, while the main arm and the auxiliary arm act independently but keep a box stable, so as to accurately place the box to a required position and grab the box by the mechanical arm.

DETAILED DESCRIPTION OF THE PREFERRED EMBODIMENTS

Figure 1:
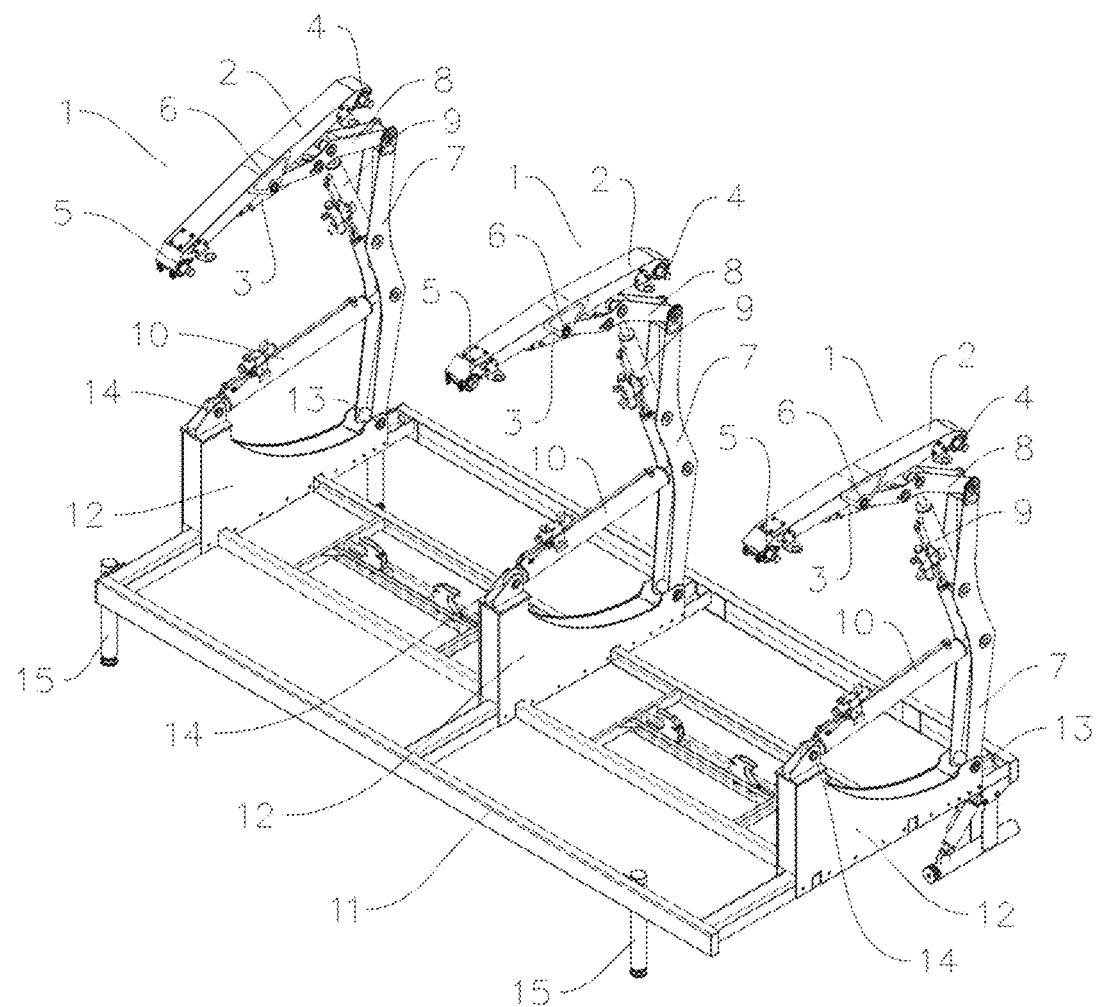
FIG. 1 is a structural representation of the present invention.
Figure 2:
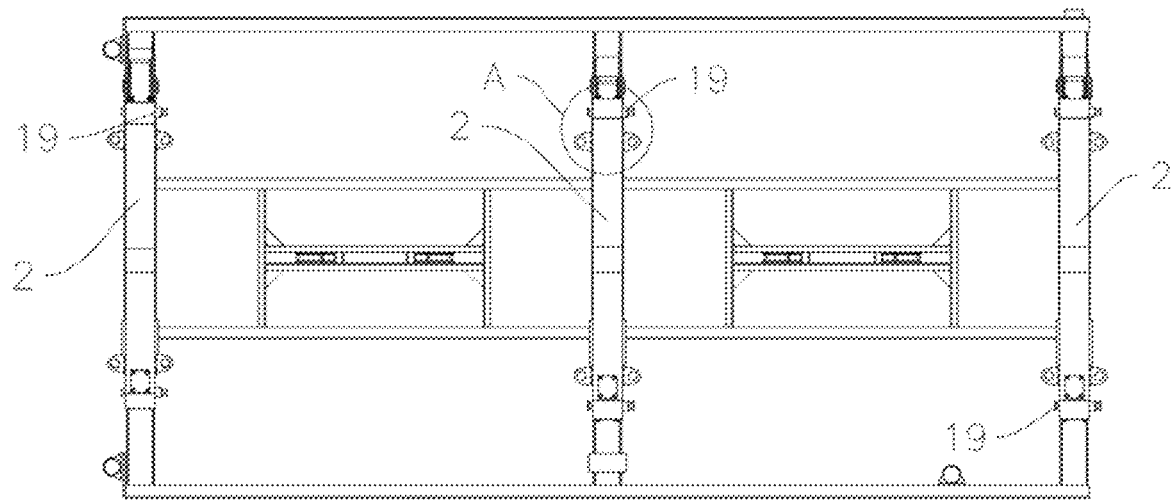
FIG. 2 is a top view of the structure of the present invention.
Figure 3:
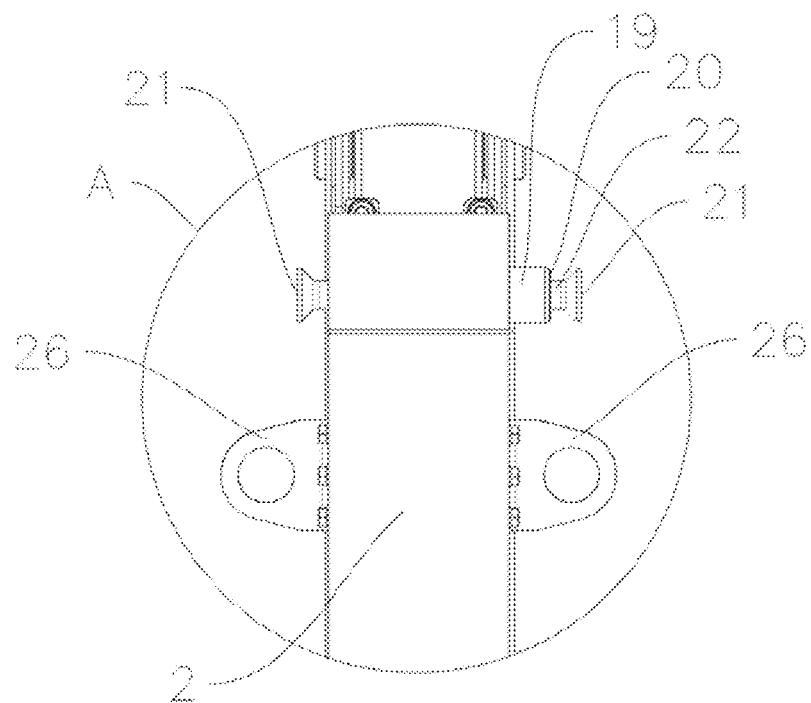
FIG. 3 is an enlarged view at A in FIG. 2.
Figure 4:
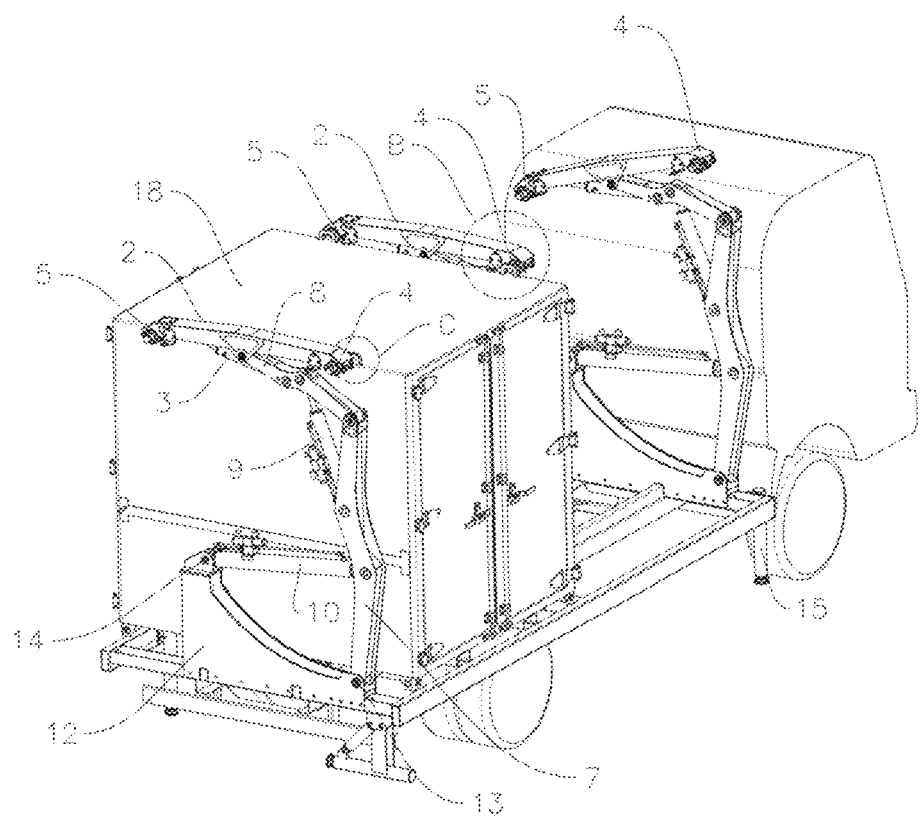
FIG. 4 is a structural representation of the working state of the present invention.
Figure 5:
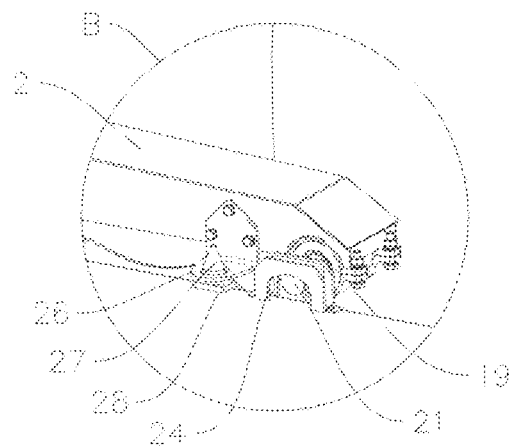
FIG. 5 is an enlarged view at B in FIG. 4.
Figure 6:
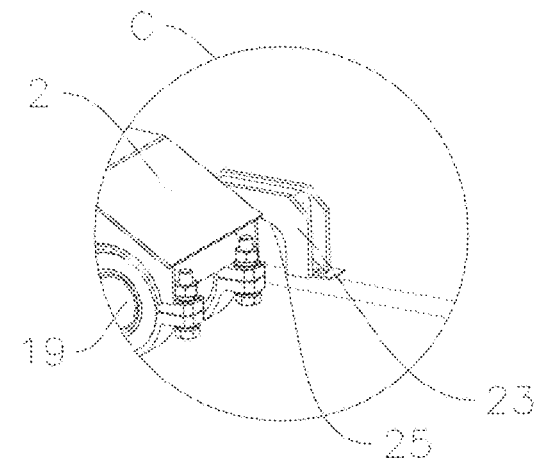
FIG. 6 is an enlarged view at C in FIG. 4.
Figure 7:
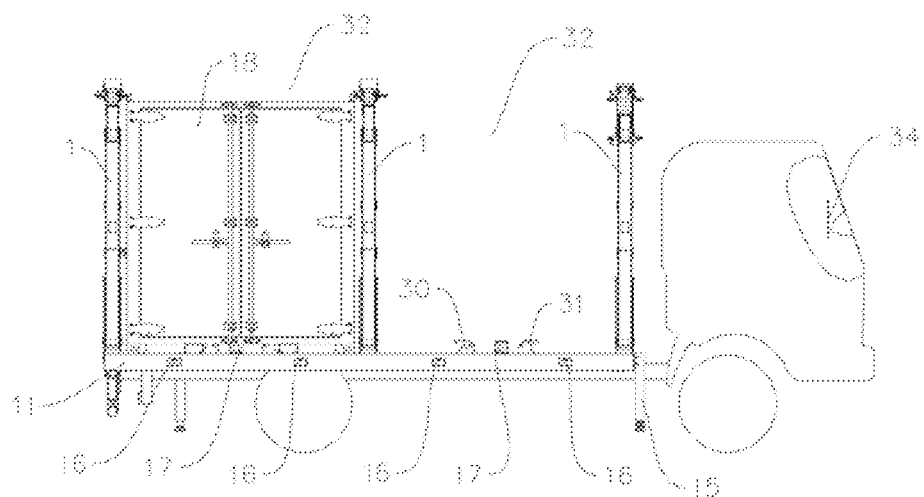
FIG. 7 is a side view of the working state of the present invention.
Figure 8:
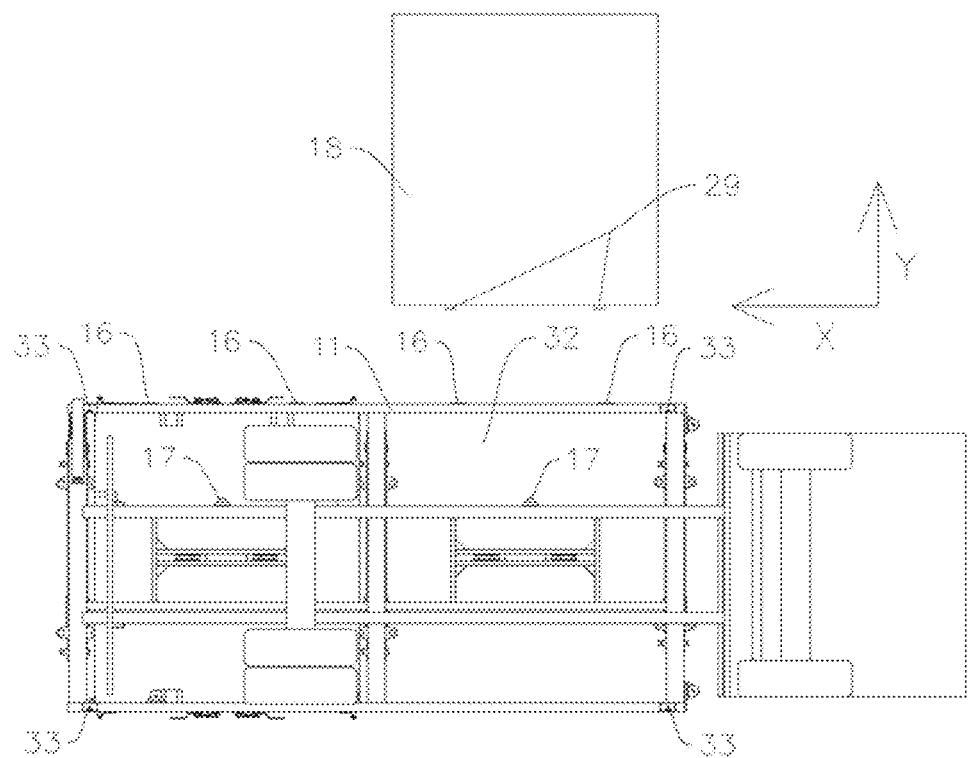
FIG. 8 is a bottom view of the working state of the present invention.

The technical solution in the embodiments of the present invention will be described clearly and completely below in combination with the accompanying drawings in the embodiments of the present invention; obviously, the described embodiments are only part of the embodiments of the present invention, not all of them. The components of the embodiments of the present invention described and illustrated in the drawings can be usually arranged and designed in various different configurations.

Therefore, the following detailed description of the embodiments of the present invention provided in the drawings is not intended to limit the scope of the claimed present invention, but only represents the selected embodiments of the present invention. Based on the embodiments of the present invention, all other embodiments obtained by a person of ordinary skill in the art without creative labor shall fall with the scope of protection of the present invention.

It should be noted that the embodiments of the present invention and the features in the embodiments can be combined with each other without conflict.

The present invention will be further described in combination with drawings and specific embodiments.

Embodiment 1

As shown in FIG. 1 to FIG. 10, an embodiment of the present invention provides a balanced lifting device, which includes at least two lifting arms 1 arranged opposite to each other. In an embodiment of the technical solution, three lifting arms 1 are provided side by side along the length direction of a vehicle; each one of the at least two lifting arms 1 includes a balance arm 2 and an actuating arm which drives the balance arm 2 to move, the balance arm 2 is rotatably connected to the actuating arm at a rotatably connected part 6, a first drive device 3 is arranged between the balance arm 2 and the actuating arm to drive the balance arm 2 to a horizontal state throughout the lifting process, the balance arm 2 is provided with a first connecting device 4 and a second connecting device 5 in butt joint with a box 18, and the rotatably connected part 6 is located between the first connecting device 4 and the second connecting device 5.

According to the technical solution, the box 18 can be stably lifted by the lifting arms 1 arranged opposite to each other. Specifically, two lifting arms 1, arranged at the front and rear ends of the box 18 respectively, are simultaneously started to lift the box 18 in the lifting process; while the balance arm 2 is driven to move by the actuating arm. Since the balance arm 2 is rotatably connected to the actuating arm, the balance arm 2 can be driven to swing correspondingly by the first drive device 3 in the swinging process of the actuating arm, so as to keep the balance arm 2 always in a horizontal state throughout the lifting process and facilitate the horizontal butt joint of the balance arm 2 with the box 18. In other words, after the actuating arm drives the balance arm 2 to move towards the box 18 in place, the balance arm 2 is always in a horizontal state so that the first connecting device 4 and the second connecting device 5 on the balance arm 2 can be in horizontal butt joint with the box 18. Further, after the first connecting device 4 and the second connecting device 5 are in butt joint with the box 18 respectively, four hooking points will be formed between the whole balanced lifting device and the box 18 in the same horizontal plane; therefore, the box 18 can be always kept in a horizontal state in the lifting process, and will not incline even if cargos loaded in the box 18 are unbalanced, thereby achieving stable lifting of cargo boxes and improving the operation safety.

Embodiment 2

This embodiment is optimized on the basis of Embodiment 1.

To better achieve the swinging of the actuating arm, the actuating arm includes a frame body and a drive device for adjusting the telescopic length of the frame body and controlling the pendulum angle of the frame body; the frame body includes at least two support arms; in this embodiment provided are two support arms, i.e. a big support arm 7 and a small support arm 8 that are rotatably connected; the frame body includes a movable support arm and a main support arm, wherein the small support arm 8 is the movable support arm and the big support arm 7 is the main support arm; and the drive device includes a second drive device 9 for driving the swinging of the small support arm 8 and a third drive device 10 for driving the swinging of the large support arm 7.

It should be noted that the first drive device 3, the second drive device 9 and the third drive device 10 can all be telescopic gas cylinders, electric telescopic rods, telescopic oil cylinders, or the like. In this technical solution, the first drive device 3, the second drive device 9 and the third drive devices 10 are all telescopic oil cylinders, namely, a first telescopic oil cylinder, a second telescopic oil cylinder and a third telescopic oil cylinder respectively.

Embodiment 3

This embodiment is optimized on the basis of Embodiment 2.

To detect the execution action, the first drive device 3, the second drive device 9 and the third drive device 10 are provided with displacement sensors, that is, the telescopic oil cylinders are all provided with oil cylinder displacement sensors.

Embodiment 4

This embodiment is optimized on the basis of Embodiment 3.

To detect the butt joint of the lifting arm 1 with the box 18, both the first connecting device 4 and the second connecting device 5 are provided with contact sensors.

Embodiment 5

This embodiment is optimized on the basis of Embodiment 4.

To facilitate the integral installation of the actuating arms, the balanced lifting device further includes an underframe 11 installed on a vehicle, and the actuating arms are installed on the underframe 11 side by side along the length direction of the underframe 11.

To increase the transverse strength of the underframe 11, a plurality of pedestals 12 are arranged on the underframe 11 side by side along the length direction thereof, with the number of the pedestals 12 consistent with that of the actuating arms; the pedestals 12 are provided with support arm articulation positions 13 and oil cylinder articulation positions 14, with the height of the support arm articulation positions 13 lower than that of the oil cylinder articulation positions 14; a lower end of the big support arm 7 is hinged with the support arm articulation positions 13, and one end of the third telescopic oil cylinder is hinged with the oil cylinder articulation positions 14; the large support arm 7 and the third telescopic oil cylinder are hinged on the pedestals 12, that is, the large support arm 7 and the third oil cylinder share the same pedestals 12 to form a whole, which increases the overall structural strength and the lateral strength of the underframe 11.

Four corners of the underframe 11 are provided with hydraulic support legs 15, which are controlled to extend outward to the ground in case of heavy goods, so as to improve the safety of loading and unloading cargo boxes.

Embodiment 6

This embodiment is optimized on the basis of Embodiment 5.

To detect a vehicle position state, which is helpful to guide the vehicle running process and improve the convenience of vehicle operation and the accuracy of vehicle parking, one side, close to the box 18, of the underframe 11, is provided with a first distance measuring module 16 and a camera 17, and four corners of the underframe 11 are provided with second distance measuring modules 33.

In this technical solution, the first distance measuring module 16 and the second distance measuring module 33 can be selected from laser distance measuring modules used in this embodiment, which provide high detection accuracy.

Embodiment 7

This embodiment is optimized on the basis of Embodiment 6.

To facilitate the horizontal butt joint of the first connecting device 4 and the second connecting device 5 with the box 18, both the first connecting device 4 and the second connecting device 5 include a telescopic butt-joint device and a first hooking part arranged at one end thereof, and the first hooking part is connected to a second hooking part arranged at a corresponding position on the box 18.

It should be noted that the telescopic butt-joint device can be a telescopic gas cylinder, an electric telescopic rod, a telescopic butt-joint oil cylinder 19, or the like. In this technical solution, the telescopic butt-joint oil cylinder 19 is adopted, and an oil cylinder displacement sensor is arranged thereon.

It should be noted that, in this technical solution, when three or more lifting arms 2 are installed on a vehicle, the intermediate lifting arm 2 should be able to work with the lifting arms 2 on both sides, and the telescopic butt-joint oil cylinder 19 should be in butt joint with the two boxes 18 when lifting the two boxes 18 respectively; therefore, a bidirectional oil cylinder is used as the telescopic butt-joint oil cylinder 19.

Embodiment 8

This embodiment is optimized on the basis of Embodiment 7.

To form a stable frame structure between the whole lifting device and the box 18 in the lifting process, an abutting device is arranged between the balance arm 2 and the box 18 to prevent the balance arm 2 from inclining inwards in the lifting process, and the abutting device includes an abutting table 20 arranged on the balance arm 2 and an abutment 23 arranged on the box 18 and abutting against the abutting table 20.

The first hooking part includes an abutting table 20 and a hooking end 21, with a narrow hooking part 22 formed therebetween; and the second hooking part includes an abutment 23 and a hooking groove 24, with a hooking ring 25 formed therebetween; wherein one side, close to the abutting table 20, of the hooking ring 25 is an abutment 23; under the condition that the balance arm 1 is in successfully butt joint with the box 18, the narrow hooking part 22 is hooked to the hooking ring 25, the hooking end 21 is disposed in the hooking groove 24, and the abutting table 20 abuts against the abutment 23.

In this technical solution, driven by the telescopic butt-joint oil cylinder 19, the lifting arm 1 can be hooked to the box 18 and the abutting table 20 butts against the abutment 23, which enable the lifting arm 1 to better cooperate with the box 18. Hence, the box 18 can support the lifting arm 1 reversely in the lifting process, and can be kept in a horizontal state by combining the balance arm 2, so that a stable frame structure is formed between the lifting arm 1 and the box 18, which solves the problem that the structural strength of the lifting arm 1 will be affected due to the inward inclination of the box 18 in the lifting process.

Embodiment 9

The present invention further provides a vehicle-mounted exchange box system, which includes a controlled lifting system and a balanced lifting device as shown in Embodiment 7 or 8, wherein the controlled lifting system includes an actuator, a control module, a vehicle position state feedback module, an actuator state feedback module and a human-computer interaction terminal 34.

The actuator includes a first drive device 3, a second drive device 9, a third drive device 10 and a telescopic butt-joint device, and is used for controlling the lifting arm 1 to execute corresponding actions.

The control module controls the actuator to execute corresponding actions.

The vehicle position state feedback module includes a distance feedback module and an image feedback module, wherein the distance feedback module includes a first distance measuring module 16 arranged on one side, close to the box 18, of the underframe 11, and is used for detecting the distance between a vehicle and the box and transmitting the collected distance data to the control module; and the image feedback module includes a camera 17 arranged on one side, close to the box 18, of the underframe 11, and is used for shooting relative position relationship image between a vehicle and the box 18 and transmitting the collected image information to the human-computer interaction terminal 34.

It should be noted that two first distance measuring modules 16 are arranged along the length direction of the underframe 11, with the camera 17 located therebetween.

The actuator state feedback module includes a displacement sensor and is used for detecting the actuator action state and transmitting the collected actuator action state data to the control module.

The human-computer interaction terminal 34 is in signal connection with the camera 17 and the control module respectively.

The human-computer interaction terminal 34 includes a terminal communication module, an operation display interface and a terminal control module, wherein the terminal communication module communicates with the terminal control module bidirectionally, the operation display interface displays images shot by the camera 17 for user operation, the terminal control module processes data transmitted by the terminal communication module and generates instruction information according to user operation, and the terminal communication module is bidirectionally connected to the terminal control module that is bidirectionally connected to the operation display interface.

The first drive device 3 mainly drives the balance arm 2 to maintain a horizontal state in the lifting process by receiving the control signal from the control module.

The second drive device 9 and the third drive device 10 mainly control the swinging of the actuating arm by receiving control signals from the control module.

The distance feedback module and the actuator state feedback module are mainly used to detect a vehicle position state and an actuator action state and feed the vehicle position state data and actuator action state data back to the control module.

The control module is mainly used to receive the distance data detected by the distance feedback module and the actuator action state data fed back by the actuator state feedback module, and to control the actuator to execute corresponding execution actions.

When a driver drives a vehicle to achieve a butt joint of the balance lifting device with the box, the left and right distance and parallelism should be met at the same time, which sets a high driving standard. In this case, the operation difficulty can be greatly reduced by lowering the error requirements of left and right distance and enlarging the left and right distance.

The vehicle position feedback module can collect the real-time positional relationship data of the vehicle and the box 18, including the image data of the relative positional relationship between the vehicle and the box 18 during the moving process shot by the camera 17 and the real-time distance data of the vehicle and the box 18 collected by the first distance measuring module 16. The image data is transmitted to the human-computer interaction terminal 34 and displayed through the operation display interface, which is helpful for guiding the driver to operate the vehicle, so as to meet the alignment effect between the vehicle and the box 18 in the X direction.

The real-time distance data between the vehicle and the box 18 collected by the first distance measuring module 16 is transmitted to the control module, which makes a judgment whether the distance between the vehicle and the box 18 meets the requirements, and then are displayed through the human-computer interaction terminal 34, thus guiding the driver to operate the vehicle according to the requirements for the distance between the vehicle and the box 18 in the Y direction.

To sum up, in this technical solution, the captured images and real-time distance data is displayed on the human-computer interaction terminal 34 through the vehicle position state feedback module, and the alignment effect between the vehicle and the box 18 in the X direction and the distance in the Y direction are displayed, so that the driver can be guided to operate the vehicle in all directions, which is helpful for a driver to move the vehicle to a required position.

In addition, the position of the vehicle relative to the box 18 will reduce some errors when the vehicle stops, which brings a crucial problem how to make up for the errors between the vehicle and the box 18. Now that the position between the vehicle and the box 18 cannot be fixed every time, the motion trajectory of the lifting arm 1 should be adaptively adjusted to achieve the effective butt joint of the lifting arm 1 with the box 18. In this technical solution, the control module analyzes and processes the real-time distance data between the vehicle and the box 18 collected by the vehicle position state feedback module, so as to provide a matched motion trajectory for the lifting arm 1; and the motion direction and speed of the first drive device 3 are obtained in combination with the actuator motion state data collected by the actuator state feedback module, so as to maintain the balance arm 2 horizontal in the whole movement process.

To sum up, in this technical solution, not only can the distance data between the vehicle and the box 18 and the image data of the relative position relationship therebetween be displayed in real time through the human-computer interaction terminal 34 to provide guidance for the driver to drive the vehicle, but also the real-time distance data between the vehicle and the box 18 can be analyzed by the control module, matched with the corresponding motion trajectory of the lifting arm 1, and then combined with the actuator motion state data collected by the actuator state feedback module to obtain the motion direction and speed of the first drive device 3, so as to maintain the balance arm 2 horizontal in the whole movement process. Finally, the distance error between the vehicle and the box 18 is compensated by adjusting the motion trajectory of the lifting arm 1, so as to meet the butt-joint requirements and achieve the effective butt joint of the lifting arm with the box 18.

In addition, the human-computer interaction terminal 34 has an operation display interface on which user operations are operated by the terminal control module of the human-computer interaction terminal 34 to generate instruction information which is sent to the terminal communication module of the human-computer interaction terminal 34 and to the control module, so as to control the actuator. The human-computer interaction terminal 34 can control the operating device with one key, which is convenient and quick to operate.

The measured real-time distance data between the vehicle and the box 18 can be transmitted to the driver's video monitoring interface by means of the LAN communication between the control module and the human-computer interaction terminal 34, i.e., the operation display interface of the human-computer interaction terminal 34.

It should be noted that in this technical solution, the box 18 is provided with an identification part, which can be two box guide wires 29 arranged side by side on one side wall, close to the vehicle, of the box 18 along the X direction. In the parking process of the vehicle, the camera 17 always takes images, and transmits the images to the human-computer interaction terminal 34 in real time for display on the operation display interface thereof. The human-computer interaction terminal 34 positions the vehicle and the box in the X direction by two cross cursors, which are displayed side by side along the horizontal direction of the images displayed on the operation display interface until positions of the two box guide wires 29 displayed on the human-computer interaction terminal 34 are aligned with the two cross cursors, then the parking position of the vehicle in the X direction meets the requirements, that is, the alignment effect between the vehicle and the box 18 in the X direction is within the set range.

It should be noted that the camera 17 has a zoom function and adopts an electronic magnifier in this embodiment, which has the advantages of high magnification and high resolution and can greatly improve the clarity of the captured box guide wires 29 if applied to the present invention, thus providing a reliable guarantee for accurate alignment.

The two first distance measuring modules 16 can detect the distance between the vehicle and the box 18 in the Y direction; and when the distance between the vehicle and the box 18 in the Y direction meets the requirements, it means that the position between the vehicle and the box 18 in the Y direction meets the requirements.

It should be noted that more than two lifting arms 1 can be arranged on the underframe 11, and a loading space 32 for loading boxes is formed between adjacent lifting arms 1. Therefore, in order to load a plurality of boxes 18, prior to lifting the box 18, the vehicle should move such that the alignment effect between the loading space 32 and the box 18 to be lifted in the X direction and the distance in the Y direction meet the requirements. That is, when a plurality of loading spaces 32 are provided on the underframe 11, a plurality of groups of first distance measuring modules 16 and cameras 17 that are matched with the plurality of loading spaces 32 respectively should be arranged on the underframe 11, wherein two first distance measuring modules 16 and cameras 17 located between the two first distance measuring modules 16 are included in one group.

It should be noted that in order to lock the box conveniently, the underframe 11 is also provided with a box locking device, which includes a left box locking hook 30 and a right box locking hook 31 symmetrically arranged on both sides of the camera 17, and the height of the box locking device is higher than an upper end of the camera 17.

In addition, since the actuator state feedback module can feed back the execution state in real time, the control module obtains the driving direction and speed of the first telescopic oil cylinder according to the movement trajectory information of the lifting arm and the detection result of the oil cylinder displacement sensor, and controls the balance arm 2, thus enabling the balance arm 2 to maintain a horizontal state in the whole process of the lifting arm 1 and achieving the automatic control of the balance arm 2.

To sum up, this technical solution can guide the vehicle to move to a required position, so as to ensure effective butt joint of the lifting arm 1 with the box 18, and can automatically adjust the balance arm 2 to keep it in a horizontal state throughout the lifting process, thus improving the degree of automation and work efficiency.

Embodiment 10

This embodiment is optimized on the basis of Embodiment 9.

The vehicle-mounted exchange box system further comprises a butt joint state feedback module, which comprises contact sensors arranged on the first connecting device 4 and the second connecting device 5 and is used for detecting the butt joint of the lifting arm 1 with the box 18 and transmitting the collected butt joint state data to the control module.

The vehicle position feedback module further includes a vehicle horizontal state detection module, which includes second distance measuring modules 33 arranged at four corners of the underframe 11 and is used for detecting the horizontal state of the vehicle and transmitting the collected horizontal state distance data to the control module.

Figure 9:
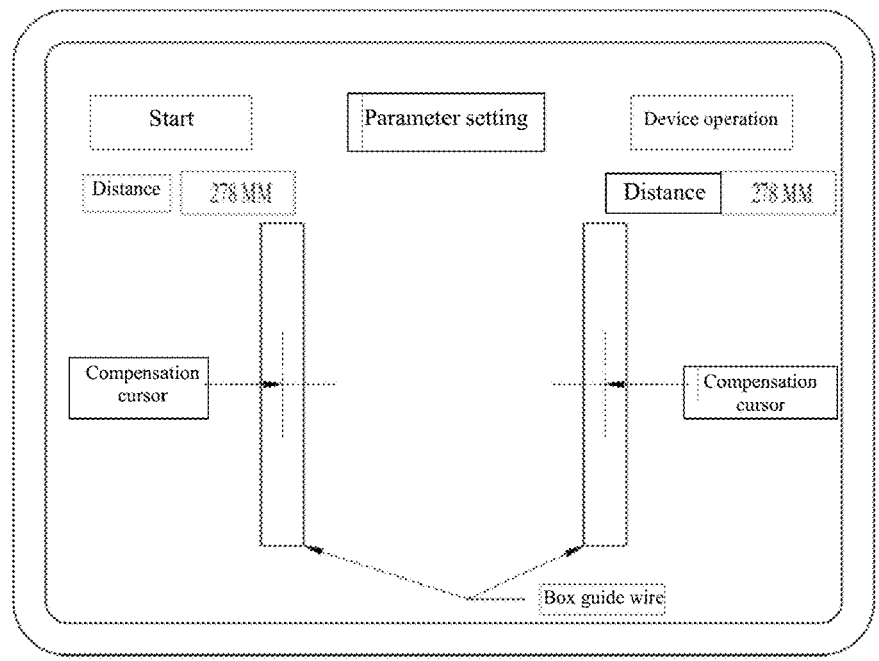
FIG. 9 is a structural representation of a display positioning interface of a human-computer interaction terminal in the present invention.
Figure 10:
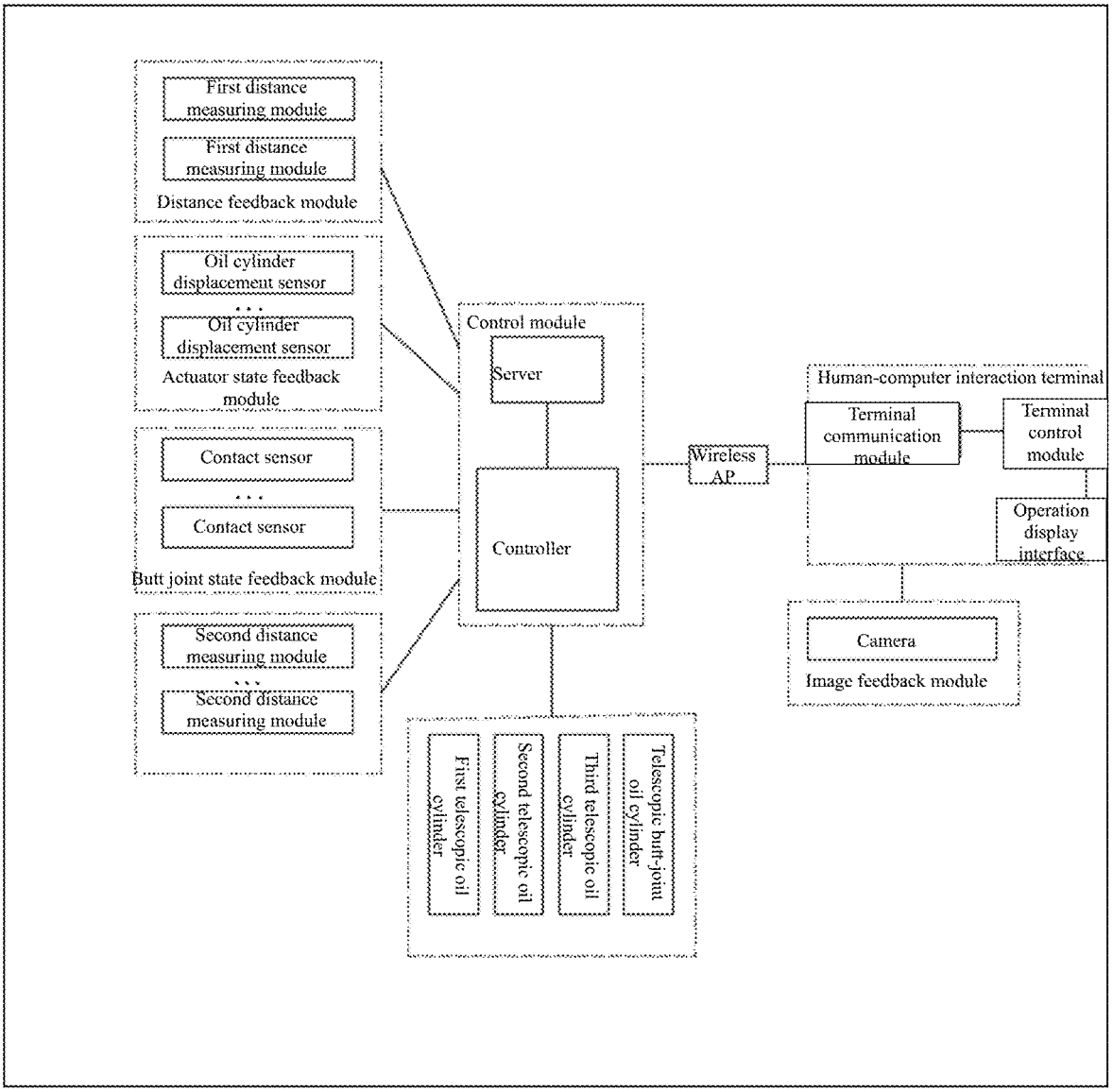
FIG. 10 is a working principle diagram of the present invention.

In the actual operation environment, the device may differ horizontally from the box 18 to be grabbed due to uneven ground and out-of-level vehicle itself; as a result, the driver may not be able to accurately judge the relative position between the vehicle body and the box 18, resulting in grabbing failure. Therefore, in this technical solution, the vehicle position state feedback module further includes second distance measuring modules 33 arranged at four corners of the underframe 11 and used for feeding the detection data back to the control module to obtain the distance from the ground, which is analyzed and processed to obtain the inclination and pitch angle of the vehicle body relative to the horizontal plane, as shown in FIG. 9. Then, with the standard cross cursor as a reference, positions of two cross cursors change according to the actual inclination angle of the vehicle; meanwhile, a compensation cursor is made on the screen; when the compensation cursor on the screen coincides with the corresponding box guide wire 29 on the box 18 with the vehicle driven by the driver, it means that the parking position in the X direction meets the requirements.

In addition, in practical application scenarios, an uneven road causes a device action error, which prevents the device from accurately reaching a predetermined position in the butt-joint process. The butt joint state feedback module can feed back the butt joint state of the wagon box in real time, and the control module can obtain the driving direction and speed of the corresponding telescopic oil cylinder according to the feedback data, so as to control the state of the big support arm 7 and the balance arm 2 until the butt joint state feedback module feeds back a butt joint in-place signal.

Specifically, in order to improve the convenience of device control operation, the control module includes a controller and a server, which are in communication connection with each other, and the human-computer interaction terminal 34 is in communication connection with the controller. The first distance measuring module 16, the second distance measuring module 33, the oil cylinder displacement sensor and the contact sensor are all connected to the controller, and the controller is connected to the first telescopic oil cylinder, the second telescopic oil cylinder, the third telescopic oil cylinder and the telescopic butt-joint oil cylinder 19.

When the vehicle moves slowly and enables the balanced lifting device to correspond to the box 18, the real-time distance between the vehicle body and the box 18 is read by the first distance measuring module 16, and the measured data is transmitted to the driver's video monitoring interface through the device LAN communication, that is, the operation display interface of the human-computer interaction terminal 34. Then, the real-time distance data between the vehicle body and the box 18 is reported to the server to match the reasonable motion trajectory of the lifting arm 1. After matching, the motion trajectory information of the lifting arm 1 is sent to a programmable controller. The motion direction and speed of the first drive device 3 are obtained according to the motion trajectory information of the lifting arm 1 and the actuator action state data collected by the actuator state feedback module, so as to maintain the balance arm 2 horizontal in the whole movement process.

The human-computer interaction terminal 34 receives operation instructions through the operation display interface and sends the instructions to the controller for analysis and processing, which then sends a control signal to the actuator, so as to control the actuator to execute corresponding actions. The human-computer interaction terminal 34 can control the operating device with one key by a tablet computer, which is convenient and quick to operate.

It should be noted that when the lifting arm 1 abuts against the box 18 at short range, four contact sensors do not send out contact signals at the same time, and the butt joint failure will occur in the telescopic butt-joint oil cylinder 19. The data can be fed back to the controller through the contact sensors, and the controller adjusts the states of the big support arm 7 and the balance arm 2 to ensure that all four sensors can send out contact signals at the same time.

It should be noted that, in order to facilitate the installation of the contact sensor and achieve the auxiliary positioning effect, both the first connecting device 4 and the second connecting device 5 include a first positioning member, and a second positioning member in butt joint with the first positioning member is arranged on a corresponding position of the box 18, and the contact sensor is arranged on the first positioning member; when the balance arm 1 is in butt joint with the box 18, the second positioning member will trigger the contact sensor on the first positioning member.

Specifically, the first positioning member is a positioning ring 26, and the second positioning member includes a positioning pin 27 and a positioning seat 28 fixed on the box, with the positioning pin 27 fixed on the positioning seat 28. The contact sensor is arranged on a position, toward the positioning seat 28, of the positioning ring 26. Under the condition that the balance arm 1 is in successful butt joint with the box 18, the positioning pin 27 is located in the positioning ring 26 and the positioning seat 28 triggers the contact sensor on the positioning ring 26.

It should be noted that in this technical solution, two positioning rings 26 are respectively arranged on both sides of the balance arm 2, and four positioning rings 26 are symmetrically arranged in pairs, so as to use the intermediate lifting arm 2 together with the lifting arms 2 on both sides when three or more lifting arms 2 are installed on the vehicle.

It should be noted that the contact sensors, not limited to the above design, can be arranged on the balance arm 2 in other ways, that is, in the butt joint state, the positioning seat 28 on the box 18 will trigger the contact sensors at four positions at the same time, thus giving contact signals.

To sum up, in this technical solution, a butt joint state feedback module is provided to detect the butt joint state, which ensures effective butt joint of the lifting arm 1 with the box 18 in various application environments.

It should be noted that in this technical solution, the first distance measuring module 16 and the second distance measuring module 33 can be selected from laser distance measuring modules used in this embodiment, which provide high detection accuracy.

The vehicle-mounted exchange box system in this technical solution is highly automated and intelligent, and can automatically load and unload the box 18 when the vehicle is parked in place; moreover, the balance arm 2 and the corresponding control system are designed to ensure the stability of the box 18 in the lifting process. In addition, the balance arm 2 is such designed as to avoid inclining inward in the lifting process, so that the lifting arm 1 and the box 18 are matched well, and a stable frame structure is formed between the whole lifting arm 1 and the box 18, thus solving the problem that the structural strength of the lifting arm 1 will be affected by the inclining of the box 18 in the lifting process.

In addition, despite the gaps in the ability of drivers to learn software, the driver interaction system is highly integrated to achieve the effect of "foolproof operation", which reduces the learning cost and achieves accurate control. The human-computer interaction terminal 34 can control the movement of the lifting arm 1 through a visual operation display interface, control the operating device with one key, display the real-time data of the device through the operation display interface, and debug the equipment parameters through the operation display interface.

In this technical solution, the controller includes a wireless communication module and a processing module, and is in communication connection to the wireless AP through the wireless communication module; the terminal communication module of the human-computer interaction terminal 34 is in communication connection to the wireless AP; the controller and the human-computer interaction terminal 34 are connected in a local area network; and the controller is in data communication with the human-computer interaction terminal 34. The driver operates the operation display interface of the human-computer interaction terminal 34, which can be a tablet computer installed in the cockpit or other on-board networking terminals. When the vehicle arrives at the station, human-computer interaction software, as one part of the human-computer interaction terminal 34, will prompt the operation of a next step after a previous step is up to standard, and makes a judgment whether the operation meets the standard during the operation according to the information fed back by the control module.

This technical solution can also include a technician debugging function, with which technicians can, through an encrypted communication channel, obtain permission and access the vehicle-mounted wireless AP, and operate the display interface to display all the data of the vehicle, so as to achieve parameter adjustment and calibrate all the vehicle-mounted sensors.

It should be noted that, in the above embodiments, the first distance measuring module 16, the camera 17 and the second distance measuring module 33 can also be installed at other corresponding positions on the vehicle, not only limited to being arranged on the underframe 11.

Embodiment 11

Figure 11:
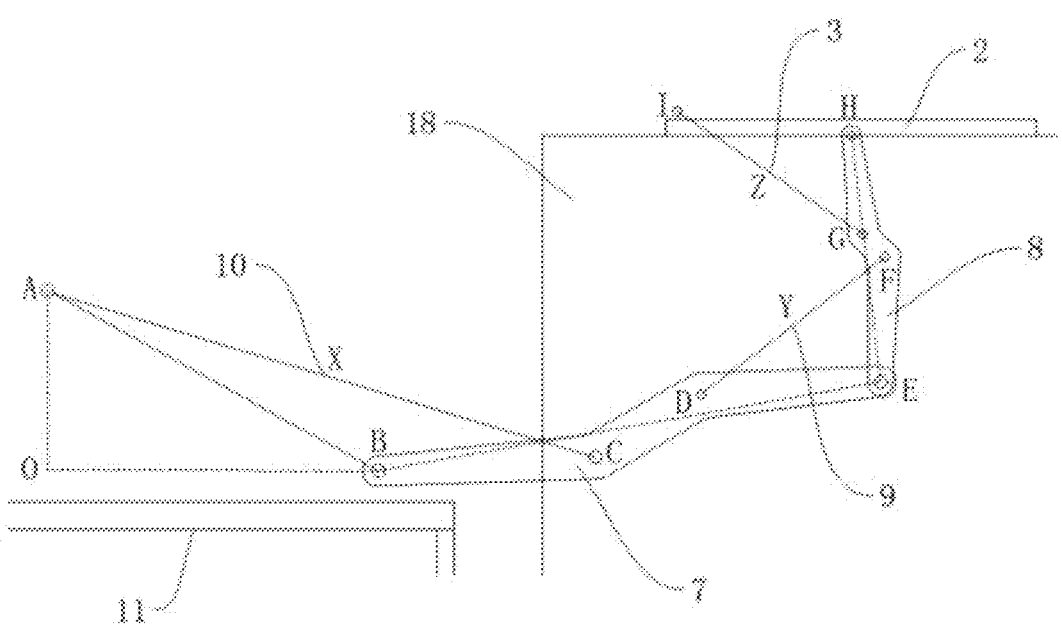
FIG. 11 is the working principle diagram of the multi-oil cylinder synchronization method in the present invention.

As shown in FIG. 11, the present invention further provides a multi-oil cylinder synchronization method, which includes the following steps:

obtaining the desired motion trajectory parameter values X, Y and Z of the two lifting arms:

the motion trajectory parameter values include the desired telescopic length value Z of the first drive device 3, the desired telescopic length value Y of the second drive device 9 and the desired telescopic length value X of the third drive device 10;

X, Y and Z are calculated as follows:

$$X=-GH \times \cos(<FED+<ABC+<ABO-\pi-<ED-BC-<HG-EF)-X_{IH})$$

$$Y=GH \times \sin(<FED+<ABC+<ABO-\pi-<ED-BC-<HG-EF)+Y_{IH})$$

$$Z=\sqrt{x^2+y^2}$$

$$<FED=\arccos((DE^2+FE^2-FD^2) \div (2 \times DE \times FE))$$

$$<ABC=\arccos((BC^2+AB^2-AC^2) \div (2 \times AB \times BC))$$

<ED−BC is an included angle between line DE and line BC;

<HG−EF is an included angle between HG line and EF line;

$Y_{IH}$ is a vertical distance between point I and point H, $Y_{IH}$=Hy−Iy;

$X_{IH}$ is a horizontal distance between point I and point H, $X_{IH}$=Hx−Ix

Hx is the horizontal coordinate of point H with point O as the origin of coordinates;

Hy is the vertical coordinate of point H with point O as the origin of coordinates;

Ix is the horizontal coordinate of point I with point O as the origin of coordinates;

Iy is the vertical coordinate of point Y with point O as the origin of coordinates;

Point H is the rotation connection point between the movable support arm and the balance arm 2, and the coordinates of point H are calculated by the following formula:

$$Hx=w1+d1+½w2; Hy=h2+h1-h3$$

d1 is a distance between the lifting arm and the box 18, that is, a distance between point B of the lifting arm and the box 18; w1 is a distance from point O to point B on the right side of a vehicle, that is, a length of OB; w2 is a width of the box 18; h1 is a relative height difference between the box 18 bottom and the device bottom; h2 is a height of the box 18; and h3 is a height from point O to the ground;

Point I is a rotational connection point between the first drive device 3 and the balance arm 2, and the horizontal coordinate and vertical coordinate of point I are as follows:

$$Ix=X; Iy=Y$$

X and Y are constants obtained according to the mechanical structure. calculating error values Δs between the two lifting arms at the current moment:

obtaining AD values Δad read by displacement sensors corresponding to the first drive device 3, the second drive device 9 and the third drive device 10 at the current moment;

calculating the telescopic length values S of the first drive device 3, the second drive device 9 and the third drive device 10 in the two lifting arms respectively at the current moment according to the obtained values Δad;

S is calculated by the following formula:

$$S = \frac{\Delta ad - \Delta d}{k}$$

Δad is an AD value read by the displacement sensor corresponding to the drive device;

Δd: compensation value;

k is a ratio of the lengths of the first drive device 3, the second drive device 9 and the third drive device 10 to the AD value read by the corresponding displacement sensors;

calculating telescopic length error values Δs between the first drive device 3, the second drive device 9 and the third drive device 10 in the two lifting arms at the current moment respectively according to the obtained telescopic length value S;

Δs is calculated by the following formula:

$$\Delta s1 = S_{z1} - S_{f1} = \frac{\Delta ad - \Delta dz1}{k} - \frac{\Delta ad - \Delta df1}{k}$$

$$\Delta s2 = S_{z2} - S_{f2} = \frac{\Delta ad - \Delta dz2}{k} - \frac{\Delta ad - \Delta df2}{k}$$

$$\Delta s3 = S_{z3} - S_{f3} = \frac{\Delta ad - \Delta dz3}{k} - \frac{\Delta ad - \Delta df3}{k}$$

the two lifting arms are the main arm and the auxiliary arm respectively:

Δs1 is a telescopic length error value between the first drive devices 3 of the main arm and of the auxiliary arm;

$S_{Z1}$ is a telescopic length of the first drive device 3 of the main arm:

$$Sz1 = \frac{\Delta ad - \Delta dz1}{k};$$

Δdz1 is a compensation value of the first drive device 3 of the main arm;

$S_{f1}$ is a telescopic length of the first drive device 3 of the auxiliary arm:

$$Sf1 = \frac{\Delta ad - \Delta df1}{k};$$

Δdf1 is a compensation value of the first drive device 3 of the auxiliary arm;

Δs2 is a telescopic length error value between the main arm and the second drive device 9 of the auxiliary arm;

$S_{Z2}$ is a telescopic length of the second drive device 9 of the main arm:

$$Sz2 = \frac{\Delta ad - \Delta dz2}{k};$$

Δdz2 is a compensation value of the second drive device 9 of the main arm;

$S_{f2}$ is a telescopic length of the second drive device 9 of the auxiliary arm:

$$Sf2 = \frac{\Delta ad - \Delta df2}{k};$$

Δdf2 is a compensation value of the second drive device 9 of the auxiliary arm;

Δs3 is a telescopic length error value between the main arm and the third drive device 10 of the auxiliary arm;

$S_{Z3}$ is a telescopic length of the third drive device 10 of the main arm:

$$Sz3 = \frac{\Delta ad - \Delta dz3}{k};$$

Δdz3 is a compensation value of the third drive device 10 of the main arm;

$S_{f3}$ is a telescopic length of the third drive device 10 of the auxiliary arm:

$$Sf3 = \frac{\Delta ad - \Delta df3}{k};$$

Δdf3 is a compensation value of the third drive device 10 of the auxiliary arm.

Calculation of difference value e(t):

the difference values e(t) between the telescopic length values S of the first drive device 3, the second drive device 9 and the third drive device 10 at the current moment and the desired telescopic length values X, Y and Z of the first drive device 3, the second drive device 9 and the third drive device 10 are calculated respectively according to the obtained X, Y and Z values and the obtained telescopic length value S;

E(t) is calculated by the following formula:

$$e(t)z1 = Xz1 - Sz1 = Xz1 - \frac{\Delta ad - \Delta dz1}{k};$$

$$e(t)f1 = Xf1 - Sf1 = Xf1 - \frac{\Delta ad - \Delta df1}{k}$$

-continued $$e(t)z2 = Yz2 - Sz2 = Yz2 - \frac{\Delta ad - \Delta dz2}{k};$$

$$e(t)f2 = Yf2 - Sf2 = Yf2 - \frac{\Delta ad - \Delta df2}{k}$$

$$e(t)z3 = Zz3 - Sz3 = Zz3 - \frac{\Delta ad - \Delta dz3}{k};$$

$$e(t)f3 = Zf3 - Sf3 = Zf3 - \frac{\Delta ad - \Delta df3}{k}$$

Xz1 is an expected telescopic length value of the first drive device 3 of the main arm;
Xf1 is an expected telescopic length value of the first drive device 3 of the auxiliary arm;
Yz2 is an expected telescopic length value of the second drive device 9 of the main arm;
Yf2 is an expected telescopic length value of the second drive device 9 of the auxiliary arm;
Zz3 is an expected telescopic length value of the third drive device 10 of the main arm;
Zf3 is an expected telescopic length value of the third drive device 10 of the auxiliary arm;
e(t)z1 is the difference between the expected telescopic length value Xz1 of the first drive device 3 of the main arm and the expected telescopic length value Sz1 of the first drive device 3 of the main arm;
e(t)f1 is the difference between the expected telescopic length value Xf1 of the first drive device 3 of the auxiliary arm and the expected telescopic length value Sf1 of the first drive device 3 of the auxiliary arm;
e(t)z2 is the difference between the expected telescopic length value Xz2 of the second drive device 9 of the main arm and the expected telescopic length value Sz2 of the second drive device 9 of the main arm;
e(t)f2 is the difference between the expected telescopic length value Xf2 of the second drive device 9 of the auxiliary arm and the expected telescopic length value Sf2 of the second drive device 9 of the auxiliary arm;
e(t)z3 is the difference between the expected telescopic length value Xz3 of the third drive device 10 of the main arm and the expected telescopic length value Sz3 of the third drive device 10 of the main arm; and
e(t)f3 is the difference between the expected telescopic length value Xf3 of the third drive device 10 of the auxiliary arm and the expected telescopic length value Sf3 of the third drive device 10 of the auxiliary arm.

Compensation Operation:
the obtained telescopic length error value Δs and the obtained difference value e(t) are input into a PID controller for compensation operation to obtain a compensation value Δd, which is solved from the e(t) of the previous node, and used to solve telescopic lengths S of the corresponding first drive device 3, second drive device 9 and third drive device 10.

The calculation formulae of the PID controller are as follows:
compensation operation of the first drive device 3 of the main arm:

$$\Delta d_{Z1} = u(t)z1 = p\left(e(t)_{Z1} + 1/TI \int e(t)_{Z1} dt + D^* de(t)_{Z1}/dt\right)$$

$$e(t)_{Z1} = Xz1 - \frac{\Delta ad - \Delta dz1}{k}$$

where, an initial value of $e(t)_{Z1}$ is 0, $e(t)_{Z1}$ of a next node is solved by $\Delta d_{Z1}$ of a previous node, and $\Delta d_{Z1}$ of a next node is solved by $e(t)_{Z1}$ of a previous node;

compensation operation of the second drive device 9 of the main arm:

$$\Delta d_{Z2} =$$
$$u(t)_{Z2} = p^*(e(t)_{Z2} + I^*(e(t1)_{Z2} + e(t2)_{Z2} + e(t3)_{Z2}) + D^*(e(t2)_{Z2} - e(t1)_{Z2})$$

$$e(t)_{Z2} = Yz2 - \frac{\Delta ad - \Delta dz2}{k}$$

where, an initial value of $e(t)_{Z2}$ is 0, $e(t)_{Z2}$ of a next node is solved by $\Delta d_{Z2}$ of a previous node, and $\Delta d_{Z2}$ of a next node is solved by $e(t)_{Z2}$ of a previous node;

compensation operation of the third drive device 10 of the main arm:

$$\Delta d_{Z3} = u(t)_{Z3} = p\left(e(t)_{Z3} + 1/I \int e(t)_{Z3} dt + D^* de(t)_{Z3}/dt\right)$$

$$e(t)_{Z3} = Zz3 - \frac{\Delta ad - \Delta dz3}{k}$$

compensation operation of the first drive device 3 of the auxiliary arm:

$$\Delta d_{f1} = u(t)_{f1} = p\left(e(t)_{f1} + 1/I \int e(t)_{f1} dt + D^* de(t)_{f1}/dt\right) - \Delta s1^* kp2$$

$$e(t)_{f1} = Xf1 - \frac{\Delta ad - \Delta df1}{k};$$

$$\Delta s1 = S_{z1} - S_{f1} = \frac{\Delta ad - \Delta dz1}{k} - \frac{\Delta ad - \Delta df1}{k}$$

where, initial values of $e(t)_{f1}$ and $\Delta s1$ are 0, $e(t)_{f1}$ of a next node is solved by $\Delta d_{f1}$ of a previous node, $\Delta s1$ of a next node is solved by $\Delta d_{f1}$ and $\Delta d_{Z1}$ of a previous node, and $\Delta d_{f1}$ of a next node is solved by $e(t)_{f1}$ and $\Delta s1$ of a previous node;

compensation operation of the second drive device 9 of the auxiliary arm:

$$\Delta d_{f2} =$$
$$u(t)_{f2} = p^*(e(t)_{f2} + I^*\left(e(t1)_{f2} + e(t2)_{f2} + e(t3)_{f2}\right) + D^*\left(e(t2)_{f2} - \Delta s2^* kp2\right)$$

$$e(t1)_{f2} = Yf2 - \frac{\Delta ad - \Delta df2}{k};$$

$$\Delta s2 = S_{z2} - S_{f2} = \frac{\Delta ad - \Delta dz2}{k} - \frac{\Delta ad - \Delta df2}{k}$$

where, initial values of $e(t)_{f2}$ and $\Delta s2$ are 0, $e(t)_{f2}$ of a next node is solved by $\Delta d_{f2}$ of a previous node, $\Delta s2$ of a next node is solved by $\Delta d_{f2}$ and $\Delta d_{Z2}$ of a previous node, and $\Delta d_{f2}$ of a next node is solved from $e(t)_{f2}$ and $\Delta s2$ of a previous node;

compensation operation of the third drive device 10 of the auxiliary arm:

$$\Delta d_{f3} =$$

$$u(t)_{f3} = p^*(e(t)_{f3} + I^*(e(t1)_{f3} + e(t2)_{f3} + e(t3)_{f3}) + D^*(e(t3)_{f3} - \Delta s3^* kp3)$$

$$e(t)_{f3} = Zf3 - \frac{\Delta ad - \Delta df3}{k};$$

$$\Delta s3 = S_{z3} - S_{f3} = \frac{\Delta ad - \Delta dz3}{k} - \frac{\Delta ad - \Delta df3}{k}$$

p is a proportional coefficient; I is an integral time constant; D is a differential time constant; parameters P, I and D are the optimum parameters obtained by debugging; kp2 is an error PID proportional coefficient; kp3 is an error PID proportional coefficient; I∫e(t)dt is an integral of errors, with the sum of errors e(t) between multiple measured values and expected values being e(t1)+e(t2)+e(t3); de(t)/dt is a differential of errors, wherein the de(t)/dt is (e(t2)−e(t1)) if error 1 is e(t1) and error 2 is e(t2).

According to the multi-oil cylinder synchronization method of the technical solution, the first drive device 3, the second drive device 9 and the third drive device 10 are telescopic oil cylinders, and the motion trajectory of the mechanical arm is calculated by combining with the field environment and split into the motion points of the working oil cylinders. Oil cylinders are controlled independently to read the desired piston position at regular intervals. Through simultaneous movement of multiple oil cylinders, the expected value is read as per time line, and six oil cylinders independently complete smooth movement. The output opening is obtained by an oil cylinder controller through PID operation. The combination of traditional PID formula and compensated PID value enables various arms to restrict each other and keep synchronous movement on the basis of independent movement in the linkage process.

The technical solution is mainly based on a time line, wherein the lowering and grabbing process of the mechanical arm is fixed and timed by a chronograph, and segmented according to different speeds, so that the mechanical arm can act at a similar speed and move more smoothly in the whole process. With T as a time interval, every T seconds, controllers of six oil cylinders involved in this movement obtain an expected position from a trajectory table, i.e., the expected motion trajectory parameter values X, Y and Z of two lifting arms, the expected position, and the position fed back by a displacement sensor, which are used for closed-loop operation; at the same time, a processor sends opening parameters of oil cylinders of various arms to proportional valves of oil cylinders, while the main arm and the auxiliary arm act independently but keep a box stable, so as to accurately place the box 18 to a required position and grab the box by the mechanical arm.

The present invention is not limited to the above optional embodiments, and anyone can obtain other products in various forms according to the teachings of the present invention. However, whatever changes are made in shape or structure, any technical solution within the scope defined by the claims of the present invention should fall within the scope of protection of the present invention.

The invention claimed is:

1. A balanced lifting device, comprising: at least two lifting arms arranged opposite to each other, wherein each one of the at least two lifting arms comprises a balance arm and an actuating arm driving the balance arm to move, the balance arm is rotatably connected to the actuating arm at a rotatably connected part, a first drive device is arranged between the balance arm and the actuating arm to drive the balance arm to a horizontal state throughout the lifting process, the balance arm is provided with a first connecting device and a second connecting device in butt joint with a box, and the rotatably connected part is located between the first connecting device and the second connecting device; the actuating arm comprises a frame body and a drive device used for adjusting the telescopic length of the frame body and controlling the pendulum angle of the frame body, wherein the frame body comprises at least two support arms, with the adjacent support arms rotatably connected in sequence, the frame body comprises a movable support arm and a main support arm, and the drive device comprises a second drive device used for driving the movable support arm to swing and a third drive device used for driving the main support arm to swing;

displacement sensors are arranged on the first drive device, the second drive device and the third drive device, contact sensors are arranged on the first connecting device and the second connecting device, the balanced lifting device further comprises an underframe arranged on a vehicle, with the actuating arms all arranged on the underframe, one side, close to the box, of the underframe, is provided with a first distance measuring module and a camera, and four corners of the underframe are provided with second distance measuring modules.

2. The balanced lifting device according to claim 1, wherein both the first connecting device and the second connecting device comprise a telescopic butt-joint device and a first hooking part arranged at one end thereof, the first hooking part is connected to a second hooking part arranged at a corresponding position on the box, an abutting device is arranged between the balance arm and the box to prevent the balance arm from inclining inwards in the lifting process, and the abutting device comprises an abutting table arranged on the balance arm and an abutment arranged on the box and abutting against the abutting table.

3. A vehicle-mounted exchange box system, comprising a controlled lifting system and the balanced lifting device according to claim 2, wherein the controlled lifting system comprises an actuator, a control module, a vehicle position state feedback module, an actuator state feedback module and a human-computer interaction terminal;

the actuator comprises a first drive device, a second drive device, a third drive device and a telescopic butt-joint device, and is used for controlling the lifting arm to execute corresponding actions;

the control module controls the actuator to execute corresponding actions;

the vehicle position state feedback module comprises a distance feedback module and an image feedback module, wherein the distance feedback module comprises a first distance measuring module arranged on one side, close to the box, of the underframe, and is used for detecting the distance between a vehicle and the box and transmitting the collected distance data to the control module; and the image feedback module comprises a camera arranged on one side, close to the box, of the underframe, and is used for shooting relative position relationship image between a vehicle and the box and transmitting the collected image information to the human-computer interaction terminal;

the actuator state feedback module comprises a displacement sensor and is used for detecting an actuator action state and transmitting the collected actuator action state data to the control module;

the human-computer interaction terminal is in signal connection with the camera and the control module respectively;

the vehicle-mounted exchange box system further comprises a butt joint state feedback module, which comprises contact sensors arranged on the first connecting device and the second connecting device and is used for detecting the butt joint of the lifting arm with the box and transmitting the collected butt joint state data to the control module; and the vehicle position state feedback module further comprises a vehicle horizontal state detection module, which comprises second distance measuring modules arranged at four corners of the underframe, and is used for detecting the horizontal state of a vehicle and transmitting the collected horizontal state distance data to the control module.

4. A multi-oil cylinder synchronization method, comprising following steps:

obtaining desired motion trajectory parameter values X, Y and Z of two lifting arms:

the motion trajectory parameter values comprise a desired telescopic length value Z of a first drive device, a desired telescopic length value Y of a second drive device and a desired telescopic length value X of a third drive device;

calculating error values Δs between the two lifting arms at the current moment:

obtaining AD values Δad read by displacement sensors corresponding to the first drive device, the second drive device and the third drive device at the current moment;

calculating telescopic length values S of the first drive device, the second drive device and the third drive device in the two lifting arms respectively at the current moment according to the obtained values Δad;

calculating telescopic length error values Δs between the first drive device, the second drive device and the third drive device in the two lifting arms at the current moment respectively according to the obtained telescopic length value S;

calculating difference values e(t):

calculating the difference values e(t) between the telescopic length values S of the first drive device, the second drive device and the third drive device at the current moment and the desired telescopic length values X, Y and Z of the first drive device, the second drive device and the third drive device respectively according to the obtained X, Y and Z values and the obtained telescopic length values S;

conducting compensation operation:

conducting compensation operation by inputting the obtained telescopic length error values Δs and the obtained difference values e(t) into a PID controller to obtain compensation values Δd;

calculating telescopic lengths S of the corresponding first drive device, second drive device and third drive device according the compensation values Δd obtained from the e(t) of the previous node.

5. The multi-oil cylinder synchronization method according to claim 4, wherein for the obtaining desired motion trajectory parameter values X, Y and Z of two lifting arms, X, Y and Z are calculated as follows:

$$X = -GH \times \angle FED + \angle ABC + \angle ABO - \pi - \angle EDBC - \angle HG - X_{IH}$$

$$Y = GH \times \sin(\angle FED + \angle ABC + \angle ABO - \pi \angle ED - BC - \angle HG - EF) + Y_{IH})$$

$$Z = \sqrt{x^2 + y^2}$$

$$\angle FED = \arccos((DE^2 + FE^2 - FD^2) \div (2 \times DE \times FE))$$

$$\angle ABC = \arccos((BC^2 + AB^2 - AC^2) \div (2 \times AB \times BC))$$

∠ED–BC is an included angle between line DE and line BC;

∠HG–EF is an included angle between HG line and EF line;

$Y_{IH}$ is a vertical distance between point I and point H, $Y_{IH} = Hy - Iy$;

$X_{IH}$ is a horizontal distance between point I and point H, $X_{IH} = Hx - Ix$ Hx is the horizontal coordinate of point H with point O as the origin of coordinates;

Hy is the vertical coordinate of point H with point O as the origin of coordinates;

Ix is the horizontal coordinate of point I with point O as the origin of coordinates;

Iy is the vertical coordinate of point Y with point O as the origin of coordinates;

Point H is the rotation connection point between the movable support arm and the balance arm, and the coordinates of point H are calculated by the following formulas:

$$Hx = w1 + d1 + \tfrac{1}{2}w2; Hy = h2 + h1 - h3$$

d1 is a distance between the lifting arm and the box, that is, a distance between point B of the lifting arm and the box; w1 is a distance from point O to point B on the right side of a vehicle, that is, a length of OB; w2 is a box width; h1 is a relative height difference between the box bottom and the device bottom; h2 is a box height; and h3 is a height from point O to the ground;

Point I is a rotational connection point between the first drive device and the balance arm, and the horizontal coordinate and vertical coordinate of point I are as follows:

$$Ix = X; Iy = Y$$

X and Y are constants obtained according to the mechanical structure.

6. The multi-oil cylinder synchronization method according to claim 4, wherein in the calculating error values Δs between the two lifting arms at the current moment:

S is calculated by the following formula:

$$S = \frac{\Delta ad - \Delta d}{k}$$

Δad is an AD value read by the displacement sensor corresponding to the drive device;

Δd: compensation value;

k is a ratio of the lengths of the first drive device, the second drive device and the third drive device to the AD value read by the corresponding displacement sensors;

Δs is calculated by the following formulas:

$$\Delta s1 = S_{z1} - S_{f1} = \frac{\Delta ad - \Delta dz1}{k} - \frac{\Delta ad - \Delta df1}{k}$$

$$\Delta s2 = S_{z2} - S_{f2} = \frac{\Delta ad - \Delta dz2}{k} - \frac{\Delta ad - \Delta df2}{k}$$

$$\Delta s3 = S_{z3} - S_{f3} = \frac{\Delta ad - \Delta dz3}{k} - \frac{\Delta ad - \Delta df3}{k}$$

the two lifting arms are the main arm and the auxiliary arm respectively:

Δs1 is a telescopic length error value between the first drive devices of the main arm and of the auxiliary arm;
Sz1 is a telescopic length of the first drive device of the main arm:

$$Sz1 = \frac{\Delta ad - \Delta dz1}{k};$$

Δdz1 is a compensation value of the first drive device of the main arm;
Sf1 is a telescopic length of the first drive device of the auxiliary arm:

$$Sf1 = \frac{\Delta ad - \Delta df1}{k}$$

Δdf1 is a compensation value of the first drive device of the auxiliary arm;
Δs2 is a telescopic length error value between the main arm and the second drive device of the auxiliary arm;
Sz2 is a telescopic length of the second drive device of the main arm:

$$Sz2 = \frac{\Delta ad - \Delta dz2}{k};$$

Δdz2 is a compensation value of the second drive device of the main arm;
$S_{f2}$ is a telescopic length of the second drive device of the auxiliary arm:

$$Sf2 = \frac{\Delta ad - \Delta df2}{k};$$

Δdf2 is a compensation value of the second drive device of the auxiliary arm;
$\Delta_{s3}$ is a telescopic length error value between the main arm and the third drive device of the auxiliary arm;
$S_{z3}$ is a telescopic length of the third drive device of the main arm:

$$Sz3 = \frac{\Delta ad - \Delta dz3}{k};$$

Δdz3 is a compensation value of the third drive device of the main arm;
$S_{f3}$ is a telescopic length of the third drive device of the auxiliary arm:

$$Sf3 = \frac{\Delta ad - \Delta df3}{k};$$

Δdf3 is a compensation value of the third drive device of the auxiliary arm.

7. The multi-oil cylinder synchronization method according to claim 4, wherein when calculating the difference value e(t), E (t) is calculated by the following formulas:

$$e(t)z1 = Xz1 - Sz1 = Xz1 - \frac{\Delta ad - \Delta dz1}{k};$$

$$e(t)f1 = Xf1 - Sf1 = Xf1 - \frac{\Delta ad - \Delta df1}{k}$$

$$e(t)z2 = Yz2 - Sz2 = Yz2 - \frac{\Delta ad - \Delta dz2}{k};$$

$$e(t)f2 = Yf2 - Sf2 = Yf2 - \frac{\Delta ad - \Delta df2}{k}$$

$$e(t)z3 = Zz3 - Sz3 = Zz3 - \frac{\Delta ad - \Delta dz3}{k};$$

$$e(t)f3 = Zf3 - Sf3 = Zf3 - \frac{\Delta ad - \Delta df3}{k}$$

Xz1 is an expected telescopic length value of the first drive device of the main arm;
Xf1 is an expected telescopic length value of the first drive device of the auxiliary arm;
Yz2 is an expected telescopic length value of the second drive device of the main arm;
Yf2 is an expected telescopic length value of the second drive device of the auxiliary arm;
Zz3 is an expected telescopic length value of the third drive device of the main arm;
Zf3 is an expected telescopic length value of the third drive device of the auxiliary arm;
e(t)z1 is the difference between the expected telescopic length value Xz1 of the first drive device of the main arm and the expected telescopic length value Sz1 of the first drive device of the main arm;
e(t)f1 is the difference between the expected telescopic length value Xf1 of the first drive device of the auxiliary arm and the expected telescopic length value Sf1 of the first drive device of the auxiliary arm;
e(t)z2 is the difference between the expected telescopic length value Xz2 of the second drive device of the main arm and the expected telescopic length value Sz2 of the second drive device of the main arm;
e(t)f2 is the difference between the expected telescopic length value Xf2 of the second drive device of the auxiliary arm and the expected telescopic length value Sf2 of the second drive device of the auxiliary arm;
e(t)z3 is the difference between the expected telescopic length value Xz3 of the third drive device of the main arm and the expected telescopic length value Sz3 of the third drive device of the main arm; and
e(t)f3 is the difference between the expected telescopic length value Xf3 of the third drive device of the auxiliary arm and the expected telescopic length value Sf3 of the third drive device of the auxiliary arm.

8. The multi-oil cylinder synchronization method according to claim 4, wherein in the compensation operation, the calculation formulae of the PID controller are as follows:

compensation operation of the first drive device of the main arm:

$$\Delta d_{Z1} = u(t)_{Z1} = p\left(e(t)_{Z1} + 1/TI \int e(t)_{Z1} dt + D * de(t)_{Z1}/dt\right)$$

$$e(t)_{Z1} = Xz1 - \frac{\Delta ad - \Delta dz1}{k}$$

where, an initial value of e(t)Z1 is 0, $e(t)_{z1}$ of a next node is solved by $\Delta d_{z1}$ of a previous node, and $\Delta d_{z1}$ of a next node is solved by $e(t)_{z1}$ of a previous node;

compensation operation of the second drive device of the main arm:

$$\Delta d_{Z2} =$$
$$u(t)_{Z2} = p*(e(t)_{Z2} + I*(e(t1)_{Z2} + e(t2)_{Z2} + e(t3)_{Z2}) + D*(e(t2)_{Z2} - e(t1)_{Z2})$$

$$e(t)_{Z2} = Yz2 - \frac{\Delta ad - \Delta dz2}{k}$$

where, an initial value of $e(t)_{z2}$ is 0, $e(t)_{z2}$ of a next node is solved by $\Delta d_{z2}$ of a previous node, and $\Delta d_{z2}$ of a next node is solved by $e(t)_{z2}$ of a previous node;

compensation operation of the third drive device of the main arm:

$$\Delta d_{Z3} = u(t)_{Z3} = p\left(e(t)_{Z3} + 1/I \int e(t)_{Z3} dt + D * de(t)_{Z3}/dt\right)$$

$$e(t)_{Z3} = Zz3 - \frac{\Delta ad - \Delta dz3}{k}$$

compensation operation of the first drive device of the auxiliary arm:

$$\Delta d_{f1} =$$
$$u(t)_{f1} = p\left(e(t)_{f1} + 1/I \int e(t)_{f1} dt + D * de(t)_{f1}/dt\right) - \Delta s1 * kp2$$

$$e(t)_{f1} = Xf1 - \frac{\Delta ad - \Delta df1}{k};$$

$$\Delta s1 = S_{z1} - S_{f1} = \frac{\Delta ad - \Delta dz1}{k} - \frac{\Delta ad - \Delta df1}{k}$$

where, initial values of e(t)f1 and Δs1 are 0, $e(t)_{f1}$ of a next node is solved by $\Delta d_{f1}$ of a previous node, Δs1 of a next node is solved by $\Delta d_{f1}$ and $\Delta d_{z1}$ of a previous node, and $\Delta d_{f1}$ of a next node is solved by $e(t)_{f1}$ and Δs1 of a previous node;

compensation operation of the second drive device of the auxiliary arm:

$$\Delta d_{f2} = u(t)_{f2} =$$
$$p*(e(t)_{f2} + I*(e(t1)_{f2} + e(t2)_{f2} + e(t3)_{f2}) + D*(e(t2)_{f2} - \Delta s2 * kp2)$$

$$e(t1)_{f2} = Yf2 - \frac{\Delta ad - \Delta df2}{k};$$

$$\Delta s2 = S_{z2} - S_{f2} = \frac{\Delta ad - \Delta dz2}{k} - \frac{\Delta ad - \Delta df2}{k}$$

where, initial values of $e(t)_{f2}$ and Δs2 are 0, $e(t)_{f2}$ of a next node is solved by $\Delta d_{f2}$ of a previous node, Δs2 of a next node is solved by $\Delta_{f2}$ and $\Delta d_{z2}$ of a previous node, and $\Delta d_{f2}$ of a next node is solved from $e(t)_{f2}$ and Δs2 of a previous node;

compensation operation of the third drive device of the auxiliary arm:

$$\Delta d_{f3} = u(t)_{f3} =$$
$$p*(e(t)_{f3} + I*(e(t1)_{f3} + e(t2)_{f3} + e(t3)_{f3}) + D*(e(t3)_{f3} - \Delta s3 * kp3)$$

$$e(t)_{f3} = Zf3 - \frac{\Delta ad - \Delta df3}{k};$$

$$\Delta s3 = S_{z3} - S_{f3} = \frac{\Delta ad - \Delta dz3}{k} - \frac{\Delta ad - \Delta df3}{k}$$

p is a proportional coefficient; I is an integral time constant; D is a differential time constant; kp2 is an error PID proportional coefficient; kp3 is an error PID proportional coefficient; I∫e(t)dt is an integral of errors, with the sum of errors e(t) between multiple measured values and expected values being e(t1)+e(t2)+e(t3); de(t)/dt is a differential of errors, wherein the de(t)/dt is (e(t2)−e(t1)) if error 1 is e(t1) and error 2 is e(t2).

* * * * *